United States Patent
Ito et al.

(10) Patent No.: US 8,040,391 B2
(45) Date of Patent: Oct. 18, 2011

(54) WHITE BALANCE ADJUSTMENT DEVICE, IMAGE CAPTURE DEVICE, WHITE BALANCE ADJUSTMENT METHOD, STORAGE MEDIUM, AND INTEGRATED CIRCUIT

(75) Inventors: Takeshi Ito, Osaka (JP); Haruo Yamashita, Osaka (JP); Daisuke Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 12/186,805

(22) Filed: Aug. 6, 2008

(65) Prior Publication Data
US 2009/0040335 A1 Feb. 12, 2009

(30) Foreign Application Priority Data
Aug. 6, 2007 (JP) .................................. 2007-204539
Jun. 20, 2008 (JP) .................................. 2008-161560

(51) Int. Cl.
*H04N 9/73* (2006.01)
(52) U.S. Cl. .................................................. 348/223.1
(58) Field of Classification Search .................... None
See application file for complete search history.

(56) References Cited

U.S. PATENT DOCUMENTS

| | | | |
|---|---|---|---|
| 5,808,681 A | 9/1998 | Kitajima | |
| 6,529,235 B1 * | 3/2003 | Tseng | 348/223.1 |
| 7,760,246 B2 * | 7/2010 | Dalton et al. | 348/224.1 |
| 2003/0030730 A1 * | 2/2003 | Nakayama | 348/223.1 |
| 2005/0151855 A1 * | 7/2005 | Kim | 348/223.1 |
| 2005/0243175 A1 | 11/2005 | Yamada et al. | |

FOREIGN PATENT DOCUMENTS

| | | |
|---|---|---|
| JP | 8-51632 | 2/1996 |
| JP | 8-340542 | 12/1996 |
| JP | 3540485 | 4/2004 |
| JP | 2005-102116 | * 4/2005 |
| WO | 2004/010711 | 1/2004 |

* cited by examiner

*Primary Examiner* — Sinh Tran
*Assistant Examiner* — Albert Cutler
(74) *Attorney, Agent, or Firm* — Wenderoth Lind & Ponack, L.L.P.

(57) ABSTRACT

A natural white balance is achieved in images that are captured while emitting a flash. The white balance of an image is adjusted using a WB adjustment portion and a mixture ratio calculation portion estimating a mixture ratio of an external light component and a flashed light component that are present in an image captured with emitting a flash, from the image obtained that is captured while emitting a flash and an image signal that is obtained without emitting a flash. Further, an external light WB coefficient determination portion determines an WB coefficient for the external light, a flashed light WB coefficient setting portion sets a WB coefficient for the flashed light, and a WB processing portion continuously performs WB processing on the image captured while emitting a flash by using the mixture ratio as an interpolation ratio.

11 Claims, 9 Drawing Sheets

FIG. 9A

| flash OFF image | | | flash ON image | | | OFF luminance | ON luminance | external light contribution | WB coefficient 3 | | | output image | | |
|---|---|---|---|---|---|---|---|---|---|---|---|---|---|---|
| Ra | Ga | Ba | Rb | Gb | Bb | Ya | Yb | W | Kr3 | Kg3 | Kb3 | R | G | B |
| 0.00 | 0.00 | 0.00 | 0.25 | 1.00 | 0.50 | 0.00 | 0.73 | 0.00 | 2.00 | 0.50 | 1.00 | 0.50 | 0.50 | 0.50 |
| 0.05 | 0.06 | 0.03 | 0.28 | 0.96 | 0.48 | 0.05 | 0.71 | 0.08 | 1.92 | 0.53 | 1.08 | 0.53 | 0.50 | 0.51 |
| 0.10 | 0.12 | 0.05 | 0.30 | 0.92 | 0.45 | 0.11 | 0.69 | 0.16 | 1.84 | 0.55 | 1.16 | 0.55 | 0.51 | 0.52 |
| 0.15 | 0.18 | 0.08 | 0.33 | 0.88 | 0.43 | 0.16 | 0.67 | 0.24 | 1.76 | 0.58 | 1.24 | 0.57 | 0.51 | 0.53 |
| 0.20 | 0.24 | 0.10 | 0.35 | 0.84 | 0.40 | 0.21 | 0.65 | 0.33 | 1.67 | 0.61 | 1.33 | 0.58 | 0.51 | 0.53 |
| 0.25 | 0.30 | 0.13 | 0.38 | 0.80 | 0.38 | 0.27 | 0.63 | 0.42 | 1.58 | 0.64 | 1.42 | 0.59 | 0.51 | 0.53 |
| 0.30 | 0.36 | 0.15 | 0.40 | 0.76 | 0.35 | 0.32 | 0.61 | 0.53 | 1.47 | 0.68 | 1.53 | 0.59 | 0.51 | 0.53 |
| 0.35 | 0.42 | 0.18 | 0.43 | 0.72 | 0.33 | 0.37 | 0.59 | 0.63 | 1.37 | 0.71 | 1.63 | 0.58 | 0.51 | 0.53 |
| 0.40 | 0.48 | 0.20 | 0.45 | 0.68 | 0.30 | 0.43 | 0.57 | 0.75 | 1.25 | 0.75 | 1.75 | 0.56 | 0.51 | 0.52 |
| 0.45 | 0.54 | 0.23 | 0.48 | 0.64 | 0.28 | 0.48 | 0.55 | 0.87 | 1.13 | 0.79 | 1.87 | 0.54 | 0.51 | 0.51 |
| 0.50 | 0.60 | 0.25 | 0.50 | 0.60 | 0.25 | 0.54 | 0.54 | 1.00 | 1.00 | 0.83 | 2.00 | 0.50 | 0.50 | 0.50 |

FIG. 9B

| flash OFF image | | | flash ON image | | | external light contribution | | | WB coefficient 3 | | | output image | | |
|---|---|---|---|---|---|---|---|---|---|---|---|---|---|---|
| Ra | Ga | Ba | Rb | Gb | Bb | Wr | Wg | Wb | Kr3 | Kg3 | Kb3 | R | G | B |
| 0.00 | 0.00 | 0.00 | 0.25 | 1.00 | 0.50 | 0.00 | 0.00 | 0.00 | 2.00 | 0.50 | 1.00 | 0.50 | 0.50 | 0.50 |
| 0.05 | 0.06 | 0.03 | 0.28 | 0.96 | 0.48 | 0.18 | 0.06 | 0.05 | 1.82 | 0.52 | 1.05 | 0.50 | 0.50 | 0.50 |
| 0.10 | 0.12 | 0.05 | 0.30 | 0.92 | 0.45 | 0.33 | 0.13 | 0.11 | 1.67 | 0.54 | 1.11 | 0.50 | 0.50 | 0.51 |
| 0.15 | 0.18 | 0.08 | 0.33 | 0.88 | 0.43 | 0.46 | 0.20 | 0.18 | 1.54 | 0.57 | 1.18 | 0.50 | 0.50 | 0.51 |
| 0.20 | 0.24 | 0.10 | 0.35 | 0.84 | 0.40 | 0.57 | 0.29 | 0.25 | 1.43 | 0.60 | 1.25 | 0.50 | 0.50 | 0.51 |
| 0.25 | 0.30 | 0.13 | 0.38 | 0.80 | 0.38 | 0.67 | 0.38 | 0.33 | 1.33 | 0.63 | 1.33 | 0.50 | 0.50 | 0.51 |
| 0.30 | 0.36 | 0.15 | 0.40 | 0.76 | 0.35 | 0.75 | 0.47 | 0.43 | 1.25 | 0.66 | 1.43 | 0.50 | 0.50 | 0.51 |
| 0.35 | 0.42 | 0.18 | 0.43 | 0.72 | 0.33 | 0.82 | 0.58 | 0.54 | 1.18 | 0.69 | 1.54 | 0.50 | 0.50 | 0.51 |
| 0.40 | 0.48 | 0.20 | 0.45 | 0.68 | 0.30 | 0.89 | 0.71 | 0.67 | 1.11 | 0.74 | 1.67 | 0.50 | 0.50 | 0.50 |
| 0.45 | 0.54 | 0.23 | 0.48 | 0.64 | 0.28 | 0.95 | 0.84 | 0.82 | 1.05 | 0.78 | 1.82 | 0.50 | 0.50 | 0.50 |
| 0.50 | 0.60 | 0.25 | 0.50 | 0.60 | 0.25 | 1.00 | 1.00 | 1.00 | 1.00 | 0.83 | 2.00 | 0.50 | 0.50 | 0.50 |

FIG. 9C

| | Kr1 | Kg1 | Kb1 |
|---|---|---|---|
| external light | 1.00 | 0.83 | 2.00 |
| | Kr2 | Kg2 | Kb2 |
| flash | 2.00 | 0.50 | 1.00 |

WHITE BALANCE ADJUSTMENT DEVICE, IMAGE CAPTURE DEVICE, WHITE BALANCE ADJUSTMENT METHOD, STORAGE MEDIUM, AND INTEGRATED CIRCUIT

This application claims priority to Japanese Patent Application No. 2007-204539 filed on Aug. 6, 2007 and priority to Japanese Patent Application No. 2008-161560 filed on Jun. 20, 2008. The entire disclosure of Japanese Patent Application No. 2007-204539 filed on Aug. 6, 2007 and Japanese Patent Application No. 2008-161560 filed on June 20 is hereby incorporated herein by reference.

BACKGROUND OF THE INVENTION

1. Field of the Invention

The present invention relates to technologies for adjusting the white balance of a captured image. In particular, it relates to technologies for adjusting the white balance of an image that has been captured by an image capture device that is provided with an illumination portion (flash emission device) that allows the flashed light to be controlled.

2. Description of the Related Art

Image capture devices such as digital still cameras use a flash emission device in order to illuminate an object to be captured with a flashed light as a helper light, when the light that is reflected from the object to be captured during imaging is weak. Image capture devices may also employ a flash emission device as backlight correction in order to illuminate a flashed light on a person (captured object) to brighten the person, and in doing so keep the person from appearing dark when that person is imaged against a bright background such as sunlight.

On the other hand, there are instances when capturing an image of an object to be captured after a flash emission device has emitted a flashed light results in an photograph (captured image) with an unnatural color balance with respect to the captured object image with light (illumination light) due to the lighting originally present in the image capture environment (the captured object image on the captured image that is obtained from the illumination light that is reflected off of the captured object) and the captured object image due to the flashed light (that captured object image on the captured image that is obtained from the flashed light that is reflected by the object to be captured). This is because there is a difference in the color temperature between the illumination light that originally illuminates the captured object and the flashed light.

Image capture devices such as digital still cameras generally perform processing known as white balance (WB) adjustment (hereinafter, WB adjustment). An example of this would be a case in which the object to be captured is illuminated by lighting with a low color temperature, such as an incandescent lamp, in which case adjustment is performed to relatively weaken the red (R) component signal (image data values) of the captured image data, and conversely, to strengthen the blue (B) component signal (image data values), in order to express white in the object to be captured as white on the captured image. WB adjustment can remove the effects of the illumination light, so that white objects are white objects in the captured image. Methods for finding the color temperature of the lighting include using a color sensor, estimating from the color distribution of the image data that are captured (captured image data), and selection by the user. When the image capture device captures an image using a flashed light, it can perform WB adjustment in accordance with the color temperature of the flashed light, which is already known.

However, when an image is captured using a flashed light, in many situations light other than the flashed light, that is, the illumination light (external light) originally present in the image capture environment, blends with the flashed light, and together the two illuminate the object to be captured. For this reason, performing WB adjustment based on the flashed light results in natural correction for objects that are brightly illuminated by the flashed light, however, appropriate WB adjustment is not performed for objects that are poorly lit by the flashed light or objects that are not illuminated by the flashed light at all (such as background), and this leads to an unnatural captured image (areas originally white become colors other than white in the captured image).

The image capture device disclosed by Japanese Patent Publication 3540485 is an example of a conventional image capture device for solving this problem. Japanese Patent Publication 3540485 discloses a configuration for an image capture device (electric still camera) that finds, per pixel, the ratio of pixel values of two images that are captured with and without a flashed light and determines the contribution of the flashed light based on the value of this ratio, and then, based on the results of this determination, selects a WB coefficient for the external light, a WB coefficient for the flashed light, and WB coefficients between these two, and performs WB adjustment. When "a" is the pixel value of the image captured with the emission of a flash and "b" is the pixel value of the image captured without the emission of a flash, the ratio (flashed light contribution)=a/b. With the device of Japanese Patent Publication 3540485, when a/b≈1 it is determined that that pixel is in a region not reached by the flashed light, and when a/b>>1 it is determined that that pixel is in a region that is sufficiently reached by the flashed light. Japanese Patent Publication 3540485 further discloses that by restricting the variability of the WB coefficient for each pixel, it is possible to keep the WB coefficient from changing suddenly between pixels even when the captured object has moved between the capturing of the two images.

However, the structure of the conventional image capture device has the following three problems.

The first is that with the conventional image capture device, a color pseudo-border occurs in the region where the WB coefficients are switched.

In Japanese Patent Publication 3540485, a WB coefficient for the external light, a WB coefficient for the flashed light, and a WB coefficient between the two are "selected" based on the results of "determination" of the flashed light contribution, but this intermediate WB coefficient must be a "discrete value." Thus, a color pseudo-border occurs in the region in which the WB coefficient is switched when the ratio of both the external light and the flashed light are continuously altered while irradiating the object to be captured. This is because the flashed light contribution is "non-linear." This is explained below.

First, the flashed light contribution is shown to be "non-linear."

For each pixel, when C is the external light illumination, B is the flashed light illumination, R is the reflectance, and "a" and "b" are the pixel values of pixels with and without the emission of the flashed light, the pixel values a and b become:

$$a=(C+B) \cdot R, \quad b=C \cdot R$$

and the flashed light contribution K is $$K=a/b=1+B/C.$$

Thus, the flashed light contribution K is a "non-linear" parameter (value range=1 to ∞) in which the value increases sharply the smaller the external light illumination C.

Thus, to perform linear WB adjustment with respect to a change in the external light illumination C, it is necessary to partition more narrowly the smaller the range of values of the external light illumination C, and a large number of values must be readied in a table or the like.

Further, not only it is necessary to partition based on the range of values for the external light illumination C, but there are various types of external lighting (clear skies, fluorescent light, light bulbs, etc.), and a WB coefficient must be readied for each combination thereof, and thus significant circuitry and memory are needed.

In instances where the object to be captured has moved, attempting to continuously change the WB coefficient in the regions where it has moved (regions on the captured image) and the regions where it has not moved (regions on the captured image) similarly requires many WB coefficients.

As illustrated above, it is not realistic to solve the problem by increasing the number of WB coefficients, and thus intermediate WB coefficients must be made "discrete values," resulting in color pseudo-borders in regions where the WB coefficient is switched.

Secondly, with the conventional image capture device, the precision of WB adjustment is poor, and information dropping precludes complete WB adjustment.

The region of the flashed light contribution K (=a/b) is 1 to ∞, and since it is not possible to handle the value ∞, the flashed light contribution K must be restricted to a predetermined upper limit value th.

Captured objects where K≧th are all corrected with the same WB coefficient when the upper limit value th is set to a low value, and thus the precision of WB adjustment drops. A flash is often emitted primarily in order to brighten objects that are dark, and thus the external light illumination C tends to be small and the flashed light illumination B tends to be large. The flashed light contribution K (=1+B/C) thus becomes a large value, making K≧th and lowering the precision of WB adjustment.

On the other hand, when the upper limit value th is set to a high value, a high degree of bit precision is necessary in order to maintain accuracy within a small-value region because the flashed light contribution is a "non-linear" parameter that increases abruptly, and this increases the scale of the circuitry.

Further, truncation leads to information loss and complete WB adjustment thus is not possible in the first place.

Thirdly, with the conventional image capture device, shifts in color stand out in regions where the captured object has moved.

Movement of the captured object while capturing two images with and without a flash shifts the flashed light contribution that is calculated from the two images, and this results in inappropriate WB adjustment in regions where there is movement and is expressed as a shift in color.

In the present application, this problem is solved by using a low pass filter (LPF) as described later, but in general the linear nature of a filter does not allow an LPF to be adopted for the "non-linear" flashed light contribution of Japanese Patent Publication 3540485, and thus cannot reduce color shifting.

Specifically, the flashed light contribution increases sharply the smaller the external light illumination C. The value after LPF thus is strongly affected by neighboring pixels that have extremely large values, and this precludes appropriate LPF processing.

It is conceivable to use a non-linear LPF in order to change the weighting coefficient, for example, in accordance with the pixel value. Changing the weighting coefficient with high precision, however, similarly requires weighting coefficients to be readied in a table, etc., and increases the scale of the circuit too much, and thus is not practical.

SUMMARY OF THE INVENTION

It is an object of the invention to provide a white balance adjustment device, an image capture device, a white balance adjustment method, a storage medium, and an integrated circuit, that allow the white balance to be theoretically correctly adjusted, do not cause pseudo-borders, and reduce color shifting in regions where the captured object has moved, as well as allow the white balance to be adjusted easily, and with little circuitry, with respect to images that have been captured under lighting conditions with a mixture of external light and flashed light.

A first aspect of the invention is a white balance device that is provided with a mixture ratio calculation portion, an external light WB coefficient determination portion, a flashed light WB coefficient setting portion, and a WB processing portion. The mixture ratio calculation portion calculates a mixture ratio of an external light component and a flashed light component that are present in a second image signal, based on a first image signal that is obtained without irradiating a flashed light on an object to be captured, and a second image signal that is obtained by illuminating a flashed light on the object to be captured. The external light WB coefficient determination portion determines an external light WB coefficient, which is a white balance coefficient for the external light, from the first image signal. The flashed light WB coefficient setting portion sets a flashed light WB coefficient, which is a white balance coefficient of the flashed light. The WB processing portion continuously performs white balance adjustment of the second image signal between the external light WB coefficient and the flashed light WB coefficient by using the mixture ratio as an interpolation ratio.

Here, "external light" refers to all light other than flashed light that is incident on the lens. It includes sunlight and lighting by other illumination instruments (such as fluorescent lighting).

The "mixture ratio" is the percent (0 to 100%) external light component and flashed light component in the second image signal, and may also be referred to as the "structure ratio" or the "component ratio." For example, if the mixture of the second image signal (external light component: flashed light component) is 3:1, then if the mixture ratio is defined in terms of the percent external light (external light ratio), the mixture ratio (external light ratio)=75%, whereas if the mixture ratio is defined in terms of the percent flashed light (flashed light ratio), the mixture ratio (flashed light ratio) =25%. The mixture ratio (external light ratio, flashed light ratio) is calculated as in the second and third aspects of the invention, which are discussed later, but there is no limitation to these so long as the mixture ratio is found.

"Use the mixture ratio as the interpolation ratio" includes the method set forth in the fourth and fifth aspects of the invention, which are discussed later, of continuously performing WB processing on the second image signal using a final WB coefficient, which takes on a continuous value that is obtained by interpolating the external light WB coefficient and the flashed light WB coefficient using the structure ratio as the interpolation ratio, and the method set forth in the sixth and seventh aspects of the invention, which, instead of interpolating the WB coefficients, involves creating third and fourth image signals in advance by adjusting the WB of the second image signal with the external light WB coefficient and the flashed light WB coefficient, and then continuously interpolating these with the structure ratio as the interpolation ratio; however, there is no limitation to these, and it is sufficient for the method to involve WB adjustment using the structure ratio for the interpolation ratio.

With this white balance adjustment device, WB adjustment is carried out continuously with the mixture ratio (0 to 100%) serving as the interpolation ratio. Mixture of the light is additive, and adjusting the WB according to the mixture ratio is equivalent to adjusting the WB of the external light component and the flashed light component individually, and thus theoretically correct WB adjustment is possible even for images that are captured under lighting conditions where there is a mixture of external light and flashed light.

It should be noted that another conceivable method is to treat the image signal without flash as the external light component and the difference image signal of the two with and without flash as the flashed light component and independently perform WB adjustment on each of these and sum the results to obtain a final image signal, but the difference image becomes blurred when there is captured object shake or camera shake, and therefore the final output image also is blurry. With this white balance adjustment device, only the second image signal is subjected to WB adjustment, and thus blurring due to movement in the difference image appears only in the WB coefficient. Images that have been WB adjusted by this white balance adjustment device therefore do not have luminance blurring and there is blurring only of the color, and this is difficult for people to perceive (poorer images due to captured object shake and camera shake, for example, do not stand out).

Since the mixture ratio is a linear parameter in which the ratio rises by the same amount as the increase in the external light illumination (or flashed light illumination), continuous WB adjustment can be performed without requiring determination or partitioning in three equal stages. For this reason, pseudo-borders do not occur in regions where the WB coefficient is switched even when the ratio of both the external light and the flashed light is continuously changed while the object to capture is irradiated. Further, since there is no increase in the scale of the circuitry and no memory usage due to partitioning, the white balance adjustment device can be achieved easily and with little circuitry (that is, at low cost).

Moreover, since the mixture ratio is a finite value in the range of 0 to 1, there is no information loss due to threshold processing, for example. This white balance adjustment device therefore allows complete WB adjustment to be performed, without lowering the precision of the WB adjustment.

It should be noted that this white balance adjustment is performed for each pixel or each region. Thus, high-precision WB adjustment is performed in accordance with the mixture ratio (external light ratio, flashed light ratio) of each pixel or each region. Processing in pixel units is preferable over region units in order to perform more precise WB adjustment. The white balance adjustment device has little circuitry and uses little memory, and thus high precision processing is possible in pixel units.

It should be noted that the concept of "mixture ratio" in this invention is a new concept that was not disclosed in Japanese Patent Publication 3540485. Performing interpolation using the "mixture ratio (0 to 100%)" allows for the various noticeable, excellent results described above, which were not envisioned in Japanese Patent Publication 3540485, to be achieved.

A second aspect of the invention is the first aspect of the invention, in which the mixture ratio calculation portion calculates an external light ratio, as the mixture ratio, by:

(the external light ratio)=(a signal value of the first image signal)/(a signal value of the second image signal).

Here, the "external light ratio" is the percent external light component (0 to 100%) in the second image signal.

For each pixel, when C is the external light illumination, B is the flashed light illumination, R is the reflectance, and "b" is the first image signal (without flash emission) and "a" is the second image signal (with flash emission), then "a" and "b" are:

$$a=(C+B)\cdot R,\ b=C\cdot R$$

and thus the external light ratio Kc is $$Kc=b/a=C/(C+B)$$

and this expresses the percent external light component C that is present in the second image signal (C+B).

If a exposure setting when obtaining a first image signal and a exposure setting when obtaining a second image signal are different, it is necessary to change the above equation such that the difference between the exposure settings is canceled. In general, it is preferable to adopt a darker exposure setting when obtaining the second image signal than an exposure setting when obtaining the first image signal such that the second image signal is not saturated by emitting a flash. In addition, it may be preferable to capture an image with a lighter exposure setting than normal in order to reduce noise of the first image signal. When capturing an image for obtaining the first image signal with $\alpha$ times lighter exposure setting than an exposure setting for obtaining the second image signal, an equation for calculating an external light ratio is (the external light ratio)=(a signal value of the first image signal)/((a signal value of the second image signal)*$\alpha$)

and so on. The equation is for calculating an external light ratio is not limited to the above equation, and it is possible to use equations equivalent to the above equation.

It should be noted that with regard to the "external light ratio" of the second aspect of the invention of this application, the numerator and denominator of the formula for the "flashed light contribution" of Japanese Patent Publication 3540485 have been inverted, but as mentioned earlier, the "mixture ratio (percent)" in the invention of this application is a novel concept that was not disclosed in Japanese Patent Publication 3540485, and the result of deriving a simple formula for the "external light ratio" was an expression with inverted numerator and the denominator.

Thus, the external light ratio can be calculated easily with little circuitry.

A third aspect of the invention is the first aspect of the invention, in which the mixture ratio calculation portion calculates a flashed light ratio, as the mixture ratio, by one of either:

(the flashed light ratio)=1−(a signal value of first image signal)/(a signal value of second image signal)

=(a signal value of second image signal−a signal value of first image signal)/(a signal value of second image signal).

Here, the "flashed light ratio" is the percent flashed light component (0 to 100%) of the second image signal.

Using the same parameter definitions as above, the flashed light ratio Kb is:

$$Kb=1-b/a=(a-b)/a=B/(C+B)$$

regardless of which formula is used, and this expresses the percent flashed light component B that is present in the second image signal (C+B). When capturing an image for obtaining the first image signal with α times lighter exposure setting than an exposure setting for obtaining the second image signal, an equation for calculating a flashed light ratio is (the flashed light ratio)=1−(a signal value of the first image signal)/(a signal value of the second image signal)

=((a signal value of the second image signal)*α−(a signal value of the first image signal))/((a signal value of the second image signal)*α)

and so on. The equation is for calculating an flashed light ratio is not limited to the above equation, and it is possible to use equations equivalent to the above equation.

Thus, the flashed light ratio can be calculated easily with little circuitry.

A fourth aspect of the invention is any one of the first through third aspects of the invention, in which the WB processing portion includes a WB coefficient calculation portion and a WB correction portion.

The WB coefficient calculation portion determines a final WB coefficient, which takes on a continuous value that is the white balance coefficient for performing white balance correction on the second image signal, by interpolating the value of the external light WB coefficient and the value of the flashed light WB coefficient based on the mixture ratio. The WB correction portion performs white balance correction on the second image signal based on the final WB coefficient, which takes on a continuous value.

Here, "interpolation" is a concept that includes "internal division," "inter-pole division," and "continuously finding continuous intermediate values."

Thus, WB adjustment can be performed continuously without three stage equal determination or partitioning. It also can be achieved easily and with little circuitry.

A fifth aspect of the invention is the fourth aspect of the invention, in which the WB coefficient calculation portion determines WBcoe3, which is continuously calculated by any one of:

$$WBcoe3 = WBcoe2 + w1 \cdot (WBcoe1 - WBcoe2)$$
$$= w1 \cdot WBcoe1 + (1 - w1) \cdot WBcoe2$$
$$= WBcoe1 + w2 \cdot (WBcoe2 - WBcoe1)$$
$$= (1 - w2) \cdot WBcoe1 + w2 \cdot WBcoe2$$
$$= w1 \cdot WBcoe1 + w2 \cdot WBcoe2$$

wherein w1 ($0 \leq w1 \leq 1$) is the external light ratio, w2 ($0 \leq w2 \leq 1$) is the flashed light ratio, WBcoe1 is the value of the external light WB coefficient, WBcoe2 is the value of the flashed light WB coefficient, and WBcoe3 is the final WB coefficient;

as the final WB coefficient.

It should be noted that the reason why the final WB coefficient can be readily calculated as described above is that the mixture ratio w1 or w2 can consecutively take on values from 0 to 1 (actual value).

A sixth aspect of the invention is any one of the first through third aspects of the invention, in which the WB processing portion includes an external light WB correction portion, a flashed light WB correction portion, and an interpolation portion.

The external light WB correction portion obtains a third image signal by performing white balance correction on the second image signal, based on the external light WB coefficient. The flashed light WB correction portion obtains a fourth image signal by performing white balance correction on the second image signal, based on the flashed light WB coefficient. The interpolation portion obtains the final image signal, which takes on a continuous value, by interpolating the signal value of the third image signal and the signal value of the fourth image signal, based on the mixture ratio.

With this configuration as well it is possible to achieve the same effects as in the fourth aspect of the invention.

A seventh aspect of the invention is the sixth aspect of the invention, in which the interpolation portion obtains, as the final image signal, an image signal whose signal value is Sout, which is continuously calculated by any one of:

$$Sout = S2 + w1 \cdot (S1 - S2)$$
$$= w1 \cdot S1 + (1 - w1) \cdot S2$$
$$= S1 + w2 \cdot (S2 - S1)$$
$$= (1 - w2) \cdot S1 + w2 \cdot S2$$
$$= w1 \cdot S1 + w2 \cdot S2$$

wherein w1 ($0 \leq w1 \leq 1$) is the external light ratio, w2 ($0 \leq w2 \leq 1$) is the flashed light ratio, S1 is the signal value of the third image signal, S2 is the signal value of the fourth image signal, and Sout is the signal value of the final image signal.

With this configuration as well it is possible to achieve the same effects as in the fifth aspect of the invention.

An eighth aspect of the invention is the first aspect of the invention, in which the mixture ratio calculation portion calculates an R component mixture ratio based on a first R image signal, which is the R component signal of the first image signal, and a second R image signal, which is the R component signal of the second image signal, calculates a G component mixture ratio based on a first G image signal, which is the G component signal of the first image signal, and a second G image signal, which is the G component signal of the second image signal, and calculates a B component mixture ratio based on a first B image signal, which is the B component signal of the first image signal, and a second B image signal, which is the B component signal of the second image signal. The external light WB coefficient determination portion determines an external light R component WB coefficient, an external light G component WB coefficient, and an external light B component WB coefficient from the first R image signal, the first G image signal, and the first B image signal, respectively. The flashed light WB coefficient setting portion sets a flashed light R component WB coefficient, a flashed light G component WB coefficient, and a flashed light B component WB coefficient. The WB processing portion continuously performs white balance correction between the external light R component WB coefficient, the external light G component WB coefficient, and the external light B component WB coefficient; and the flashed light R component WB coefficient, the flashed light G component WB coefficient, and the flashed light B component WB coefficient, on the second R image signal, the second G image signal, and the second B image signal, using, respectively, the R component mixture ratio, the G component mixture ratio, and the B component mixture ratio.

With this white balance adjustment device, the mixture ratio is not calculated with the luminance ($\approx 0.3R+0.6G+0.1B$), but rather the mixture ratios of the three R, G, and B components are calculated and white balance adjustment is executed independently for each color, and thus the precision of white balance adjustment can be increased even further.

A ninth aspect of the invention is any one of the first aspect through the eighth aspect of the invention, further including a LPF portion that performs low pass filter processing on the mixture ratio, calculating a smoothed mixture ratio. The WB processing portion uses the smoothed mixture ratio as the mixture ratio.

Thus, even if the object being captured or the camera itself moves during capturing of the two images with and without a flash, and inappropriate WB adjustment is performed in the region with movement and leads to color shifting, the final WB coefficient can be continuously changed at the border between the region with movement (region on the captured image) and the region without movement (region on captured image), and this allows appropriate white balance adjustment to be performed on the second image signal.

Here, unlike in Japanese Patent Publication 3540485, low-pass filter processing can be adopted because, as discussed earlier, the mixture ratio is a linear parameter in which as the external light illumination (or flashed light illumination) increases the ratio thereof increases proportionately. The flashed light contribution in Japanese Patent Publication 3540485, on the other hand, is a non-linear parameter as alluded to earlier, and thus a linear LPF file cannot be adopted.

It should be noted that here, spatial low pass filter (LPF) processing is preferably performed as the low pass filter processing. As used here, LPF is a concept that is inclusive of compatible LFP filters. A compatible LPF filter detects regions with movement from the two images with and without a flash, or from the difference image of the two, for example, and performs LPF processing by that amount only.

Here, the mixture ratio can be determined for each pixel by calculating the mixture ratio for each pixel of the first image signal and the second image signal, and thus low-pass filter processing with a spatial LPF can be executed on the mixture ratios. Thus, sudden changes in the final WB coefficient can be inhibited with ease.

It should be noted that with this white balance adjustment device, LPF processing is performed on the mixture ratio and is not performed on the image signals directly, and thus the image itself does not become blurry when there has been movement in the captured object.

Thus, this white balance adjustment device further reduces color shifting and allows for more natural WB adjustment to be performed.

A tenth aspect of the invention is an image capture device including the white balance adjustment device according to any one of the first through the ninth aspects of the invention.

An eleventh aspect of the invention is the tenth aspect of the invention, further provided with a flash emission portion that irradiates a flashed light onto an object to be captured.

Thus, the properties of the flashed light that is emitted by the flash emission portion are found in advance, and the flashed light WB coefficient setting portion sets the flashed light WB coefficient based on those properties, and thus the flashed light WB coefficient can be set more accurately.

A twelfth aspect of the invention is a white balance adjustment method that includes a mixture ratio calculation step, an external light WB coefficient determination step, a flashed light WB coefficient setting step, and a WB processing step. The mixture ratio calculation step involves calculating a mixture ratio of an external light component and a flashed light component that are present in a second image signal, based on a first image signal that is obtained without irradiating a flashed light on an object to be captured, and a second image signal that is obtained by illuminating a flashed light on the object to be captured. The external light WB coefficient determination step involves determining an external light WB coefficient, which is a white balance coefficient for the external light, from the first image signal. The flashed light WB coefficient setting step involves setting a flashed light WB coefficient, which is a white balance coefficient of the flashed light. The WB processing step involves using the mixture ratio as an interpolation ratio to continuously perform white balance adjustment between the external light WB coefficient and the flashed light WB coefficient on the second image signal.

It is thus possible to achieve a white balance adjustment method that attains the same effects as the first aspect of the invention.

A 13th aspect of the invention is a computer-readable storage medium that stores a program for causing a computer to function as a mixture ratio calculation portion, an external light WB coefficient determination portion, a flashed light WB coefficient setting portion, and a WB processing portion. The mixture ratio calculation portion calculates a mixture ratio of an external light component and a flashed light component that are present in a second image signal, based on a first image signal that is obtained without irradiating a flashed light on an object to be captured, and a second image signal that is obtained by illuminating a flashed light on the object to be captured. The external light WB coefficient determination portion determines an external light WB coefficient, which is a white balance coefficient for the external light, from the first image signal. The flashed light WB coefficient setting portion sets a flashed light WB coefficient, which is a white balance coefficient of the flashed light. The WB processing portion continuously performs white balance adjustment between the external light WB coefficient and the flashed light WB coefficient on the second image signal by using the mixture ratio as an interpolation ratio.

It is thus possible to achieve a computer-readable storage medium that stores a program that attains the same effects as the first aspect of the invention.

A 14th aspect of the invention is an integrated circuit that is provided with a mixture ratio calculation portion, an external light WB coefficient determination portion, a flashed light WB coefficient setting portion, and a WB processing portion. The mixture ratio calculation portion calculates a mixture ratio of an external light component and a flashed light component that are present in a second image signal, based on a first image signal that is obtained without irradiating a flashed light on an object to be captured, and a second image signal that is obtained by illuminating a flashed light on the object to be captured. The external light WB coefficient determination portion determines an external light WB coefficient, which is a white balance coefficient for the external light, from the first image signal. The flashed light WB coefficient setting portion sets a flashed light WB coefficient, which is a white balance coefficient of the flashed light. The WB processing portion continuously performs white balance adjustment between the external light WB coefficient and the flashed light WB coefficient on the second image signal by using the mixture ratio as an interpolation ratio.

It is thus possible to achieve an integrated circuit that attains the same effects as the first aspect of the invention.

The present invention can achieve a white balance adjustment device, an image capture device, a white balance adjustment method, a storage medium, and an integrated circuit, that allow the white balance to be theoretically correctly adjusted, do not cause pseudo-borders, and reduce color shifting in regions where the captured object has moved, as well as allow the white balance to be adjusted easily, and with little circuitry, with respect to images that have been captured under lighting conditions with a mixture of external light and flashed light.

BRIEF DESCRIPTION OF THE DRAWINGS

FIG. 9 is a table that shows the calculated results of WB adjustment in the first embodiment and the second embodiment of the invention.

DETAILED DESCRIPTION OF THE INVENTION

Embodiments of the invention are described below in reference to the drawings.

First Embodiment

<1.1: Configuration of Image Capture Device>

First, the image capture device according to the first embodiment is described.

Figure 1:
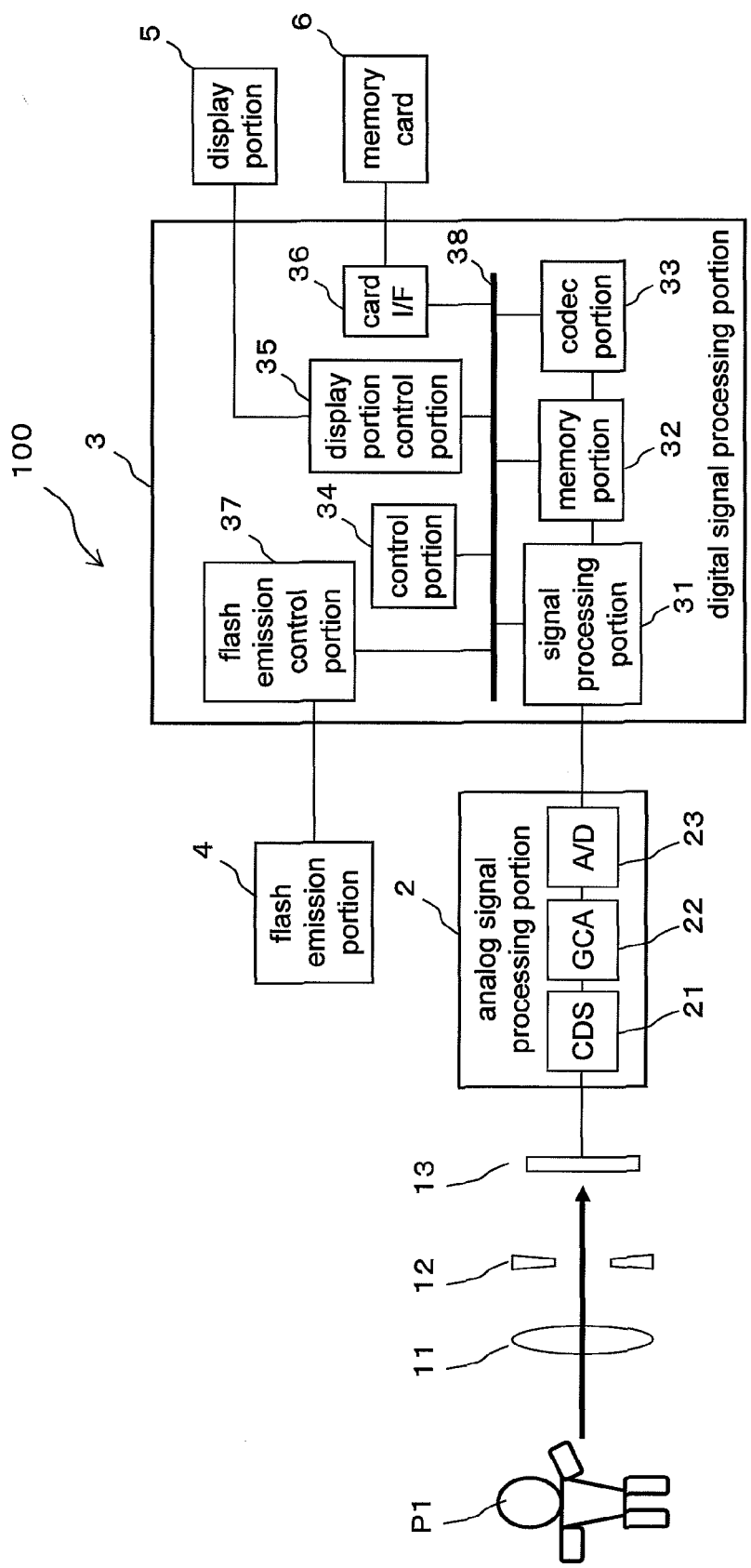
FIG. 1 is the overall configuration of the image capture device 100 of the invention.
Figure 2:
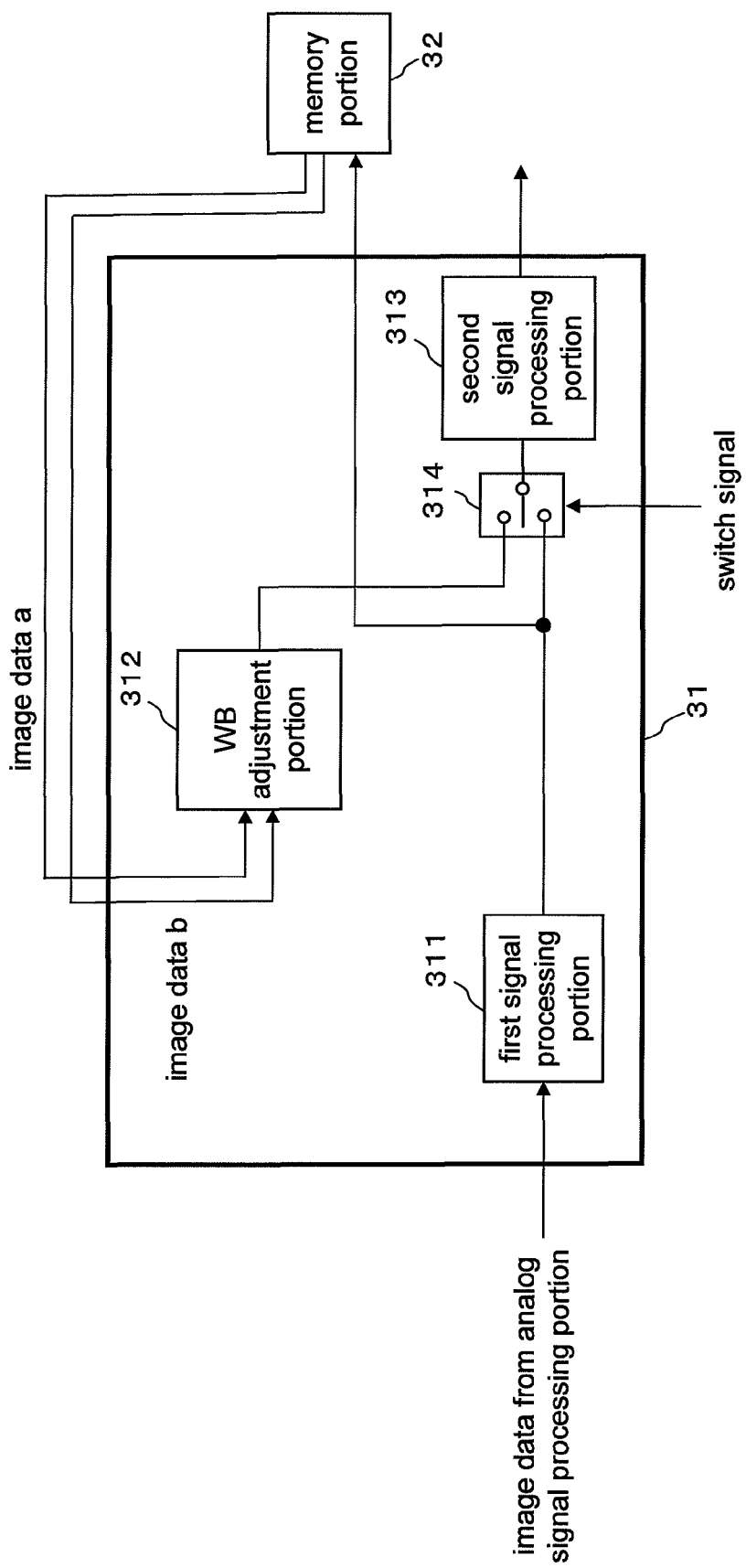
FIG. 2 is a diagram of the structure of the signal processing portion 31 and the memory portion 32 of the image capture device 100 according to the first embodiment of the invention.
Figure 4:
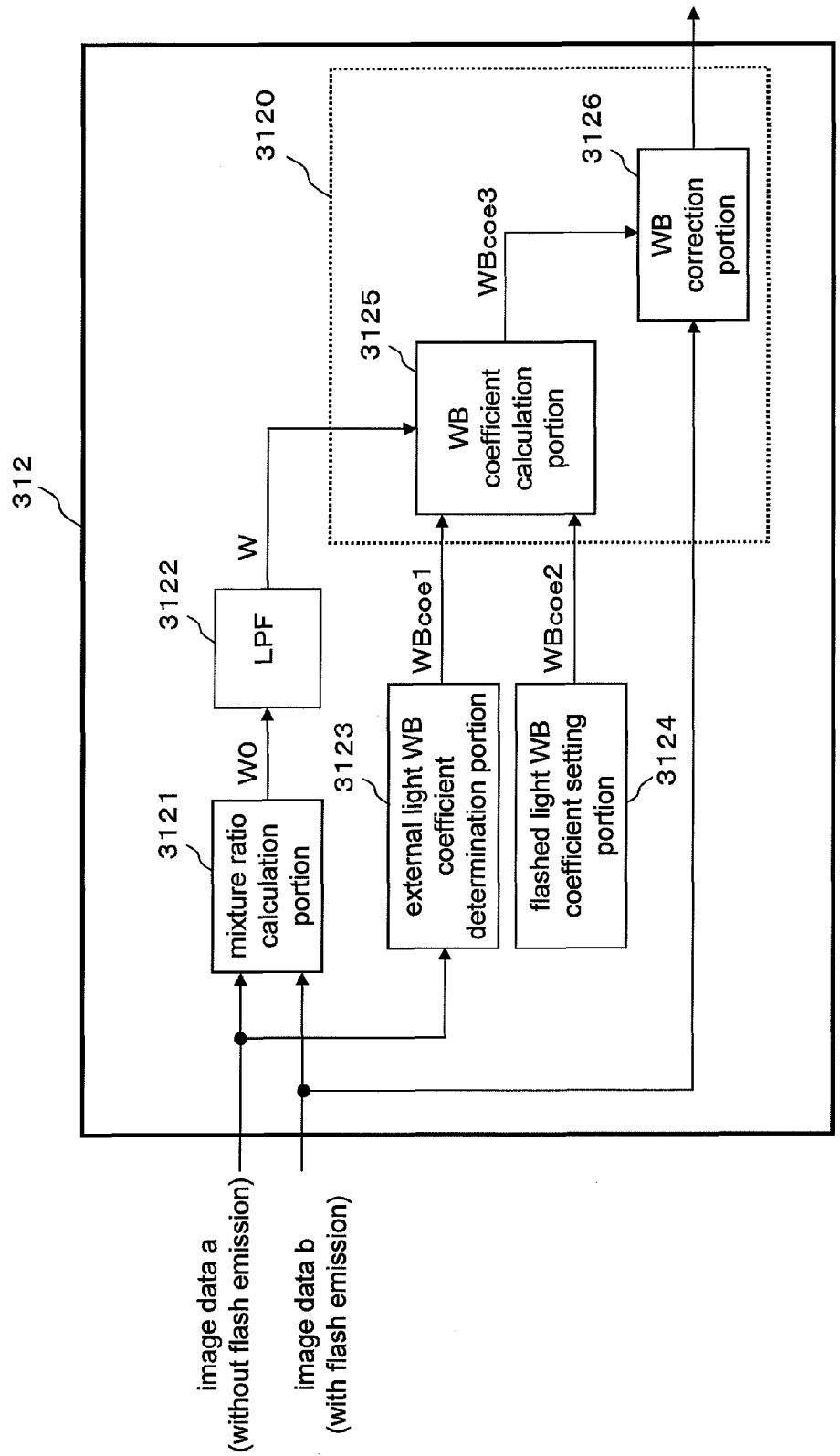
FIG. 4 is a diagram of the structure of the WB adjustment portion 312 according to the first embodiment of the invention.

FIG. 1 schematically shows the configuration of an image capture device 100 (such as a digital camera) according to the first embodiment of the invention. FIG. 2 schematically shows the configurations of a signal processing portion 31 and a memory portion 32. FIG. 4 schematically shows the configuration of a WB adjustment portion 312 serving as the white balance adjustment device.

As shown in FIG. 1, the image capture device 100 is provided with an image capture lens 11 that focuses light from an object to capture P1, an diaphragm 12 for adjusting the amount of light from the object to capture P1 that is focused by the image capture lens 11, an image capture portion (image capture element) 13 that obtains light from the object to capture P1 as an image signal (video signal) by photoelectric transformation, an analog signal processing portion 2 for performing analog processing on the image signal that is obtained by the image capture portion 13, a digital signal processing portion 3 that executes digital signal processing on the image signal that has been subjected to analog signal processing, and a flash emission portion 4 that irradiates a flashed light onto the object to capture P1.

The image capture portion 13 obtains the light from the object to capture P1 that has been focused by the image capture lens 11 and that has passed through the diaphragm 12 as an image signal (video signal) through photoelectric conversion. The image capture portion 13 outputs the image signal that it has obtained to the analog signal processing portion 2. It is preferable to use a CCD-type image sensor or a CMOS-type image sensor as the image capture portion 13.

The analog signal processing portion 2 receives the image signal that is output by the image capture portion 13, performs analog signal processing on the image signal that has been output by the image capture portion 13, converts the image signal that has been subjected to analog signal processing into a digital image signal, and outputs this to the digital signal processing portion 3. The analog signal processing portion 2 is achieved by an analog circuit known as a camera front end, and primarily is made from a correlated double sampling (CDS) circuit 21, a gain control amplifier (GCA) circuit 22, and an A/D converter 23.

The digital signal processing portion 3 has a signal processing portion 31 that performs predetermined signal processing on image signals that are output from the analog signal processing portion 2, a memory portion 32 that stores output from the signal processing portion 31, and a codec portion 33 that encodes image signals stored in the memory portion 32 and decodes image data (encoded image data) from recording media such as a memory card 6. The digital signal processing portion 3 further includes a control portion 34 that variously controls the functional components of the digital signal processing portion 3, a display portion control portion 35 that controls the display portion 5, a card I/F 36 that is an interface for inputting and outputting data (signals) with respect to the memory card 6, a flash emission control portion 37 that controls the flash emission portion 4, and a bus 38 that connects the various functional components of the signal processing portion 3 via bus. It should be noted that in this embodiment, the various functional components of the signal processing portion 3 are connected by the bus 38 as shown in FIG. 1, but the functional components of the signal processing portion 3 do not always have to be connected by a bus, and instead it is of course also possible to adopt a configuration in which the various functional blocks are connected directly so that required data (signals) can be exchanged.

As shown in FIG. 2, the signal processing portion 31 has a first signal processing portion 311, a WB adjustment portion 312, a second signal processing portion 313, and a switch 314.

The first signal processing portion 311 receives an image signal that has been output from the analog signal processing portion 2, and executes processing such as dynamic range compression or pixel interpolation on the image signal that is output from the analog signal processing portion 2. The first signal processing portion 311 then outputs the processed image signal to the memory portion 32. The first signal processing portion 311 also outputs the processed image signal to the switch 314.

The WB adjustment portion 312 has a mixture ratio calculation portion 3121, a LPF (low pass filter) portion 3122, an external light WB coefficient determination portion 3123, a flashed light WB coefficient setting portion 3124, and a WB processing portion 3120. The WB processing portion 3120 includes a WB coefficient calculation portion 3125 and a WB correction portion 3126.

The WB adjustment portion 312 receives an image signal that is obtained under imaging conditions in which there is a flashed light (this image signal is referred to as "image signal b" or "image data b") and that is output from the memory portion 32, and an image signal that is obtained under image capture conditions in which there is not a flashed light (this image signal is referred to as "image signal a" or "image data a") and that is output from the memory portion 32, and performs WB adjustment on the image signal b based on the image signal a and the image signal b, and outputs the WB-adjusted image signal b to the second signal processing portion 313 via the switch 314.

It should be noted that below, the mixture ratio is described as if it is the external light ratio, but a case in which it is the flashed light ratio is different only in that the values that are interpolated are switched, and thus such a case will not be described.

The mixture ratio calculation portion 3121 receives the image signal a and the image signal b that are output from the memory portion 32, and calculates a mixture ratio W0 from the image signal a and the image signal b through:

$$W0=a/b$$

such that $0 \leqq W0 \leqq 1$, and outputs the calculated mixture ratio W0 to the LPF portion 3122. Here, the image signal b is an image signal that is obtained by the image capture device 100 by imaging the object to capture P1 while emitting a flash, whereas the image signal a is an image signal that is obtained by imaging the object to capture P1 without emitting a flash (same applies hereinafter). Since the image signal b is an image signal captured with a flash and the image signal a is an image signal that is captured without a flash, with regard to the same pixel the relationship between the signal level (pixel value) a of the image signal a and the signal level (pixel value) b of the image signal b is such that $b \geqq a$, and therefore by setting W0 equal to a/b, the value of W0 becomes a value (real value) within the range of 0 to 1.

The LPF portion 3122 receives the mixture ratio W0 that has been estimated (calculated) by the mixture ratio calculation portion 3121, and performs LPF processing on the mixture ratio and outputs the mixture ratio that is obtained by LPF processing (smoothed mixture ratio) as W to the WB coefficient calculation portion 3125.

The external light WB coefficient determination portion 3123 receives the image signal a and calculates a WB coefficient for the image signal a from that image signal a and outputs the image signal a WB coefficient that has been calculated to the WB coefficient calculation portion 3125. Here, the image signal a is an image signal that has been obtained by imaging without a flash, and thus the WB coefficient that is calculated by the external light WB coefficient determination portion 3123 becomes the WB coefficient for the external light.

The flashed light WB coefficient setting portion 3124 sets a WB coefficient for the image signal that is obtained by imaging with a flash (flashed light WB coefficient). The flashed light WB coefficient setting portion 3124 outputs the flashed light WB coefficient that has been set to the WB coefficient calculation portion 3125. The flashed light WB coefficient is set based on a WB coefficient that is obtained in advance for the flashed light that is used by the image capture device 100. For example, because the properties of the flashed light that is emitted from the flash emission portion 4 of the image capture device 100 can be known in advance (the properties can be found by actual measurement), the flashed light WB coefficient can be found from those properties, that flashed light WB coefficient can be stored in a ROM (not shown), etc., of the image capture device 100, and the flashed light WB coefficient can be read onto the flashed light WB coefficient setting portion 3124.

The WB coefficient calculation portion 3125 receives the external light WB coefficient that is output from the external light WB coefficient determination portion 3123, the flashed light WB coefficient that is output from the flashed light WB coefficient setting portion 3124, and the mixture ratio (smoothed mixture ratio) W that is output from the LPF portion 3122, and interpolates the external light WB coefficient and the flashed light WB coefficient based on the mixture ratio (smoothed mixture ratio) W in order to calculate a WB coefficient, and then outputs the calculated WB coefficient to the WB correction portion 3126.

Figure 5:
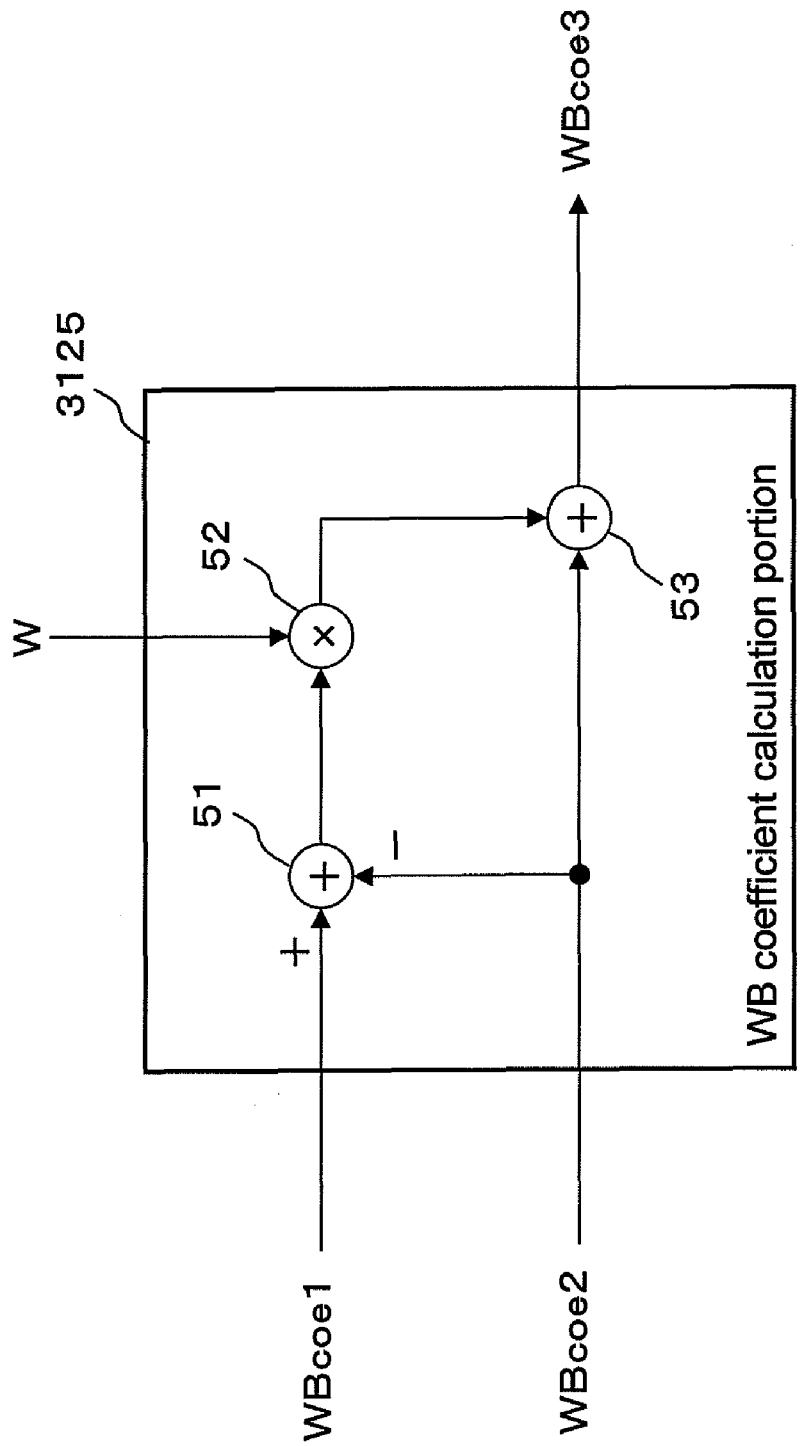
FIG. 5 is an example of the structure of the WB coefficient calculation portion 3125 according to the first embodiment of the invention.

FIG. 5 shows one example of the configuration of the WB coefficient calculation portion 3125. As shown in FIG. 5, the WB coefficient calculation portion 3125 has a subtracter 51, a multiplier 52, and an adder 53.

The subtracter 51 receives the external light WB coefficient WBcoe1 that is output from the external light WB coefficient determination portion 3123 and the flashed light WB coefficient WBcoe2 that is output from the flashed light WB coefficient setting portion 3124, and outputs the result of subtracting the two (WBcoe1−WBcoe2) to the multiplier 52.

The multiplier 52 receives the output of the subtracter 51 and the mixture ratio (smoothed mixture ratio) W that is output from the LPF 3122, and outputs the result of multiplying the two $$W \cdot (WBcoe1 - WBcoe2)$$

to the adder 53.

The adder 53 receives the flashed light WB coefficient WBcoe2 and the output of the multiplier 52 that is W·(WBcoe1−WBcoe2), and outputs the result of summing the two $$WBcoe2 + W \cdot (WBcoe1 - WBcoe2)$$

to the WB correction portion 3126. Here, the output from the adder 53 is equivalent to $$W \cdot WBcoe1 + (1-W) \cdot WBcoe2.$$

In other words, with the configuration shown in FIG. 5, the WB coefficient calculation portion 3125 can perform an interpolation computation with the mixture ratio (smoothed mixture ratio) W is the interpolation ratio. It should be noted that the WB coefficient calculation portion 3125 is not limited to the configuration of FIG. 5, and it may take on another configuration as long as it accomplishes similar interpolation processing.

The WB correction portion 3126 receives the image signal b that is output from the first signal processing portion 311 and the WB coefficient that is output from the WB coefficient calculation portion 3125. The WB correction portion 3126 performs WB correction on the image signal b based on the WB coefficient and outputs the WB-corrected image signal to the second signal processing portion 313 via the switch 314.

The switch 314 selects one of either the image signal that is output from the first signal processing portion 311 and the image signal that is output from the WB adjustment portion 312 based on the switch signal from the control portion 34, and inputs this to the second signal processing portion 313. The switch 314 is a so-called selector. In the image capture device 100, the switch 314 performs a switching operation (selection operation) when WB adjustment is being executed such that the output of the WB adjustment portion 312 is input to the second signal processing portion 313.

The second signal processing portion 313 receives the image signal that is output from the switch 314 and executes processing such as γ correction, color correction, noise reduction, and border enhancement on the image signal that has been output from the switch 314 and outputs the result to the memory portion 32.

It should be noted that the various processes that are performed by the first signal processing portion 311 and the second signal processing portion 313 are examples, and of course there are no limitations to those described above.

Based on commands from the control portion 34, the memory portion 32 stores the image signals output from the first signal processing portion 311 and outputs stored image signals to the WB adjustment portion 312. The memory portion 32 also stores image signals that are output from the second signal processing portion 313 to a separate region from the memory region in which the image signals that are output from the first signal processing portion 311 are stored. It should be noted that the memory portion 32 can also store image signals that have been encoded by the codec portion 33. The memory portion 32 can also output stored image signals, etc., to the signal processing portion 31 and the display portion control portion 35, for example, via the bus 38.

The codec portion 33 performs encoding processing (encoding by JPEG, for example) on image signals that are output from the memory portion 32 (image signals output from the second signal processing portion 313 and stored on the memory portion 32), and outputs the image signals that have been subjected to encoding (hereinafter, "encoded image signals") to recording media such as the memory card 6 via the card I/F 36. The codec portion 33 also performs decoding processing (decoding by JPEG, for example) on the encoded image signals that are output from recording media such as the memory card 6, and outputs the result to the signal processing portion 31, the memory portion 32, and the display portion control portion 35, for example.

The control portion 34 variously controls the functional components of the digital signal processing portion 3. As the control portion 34 it is preferable to use a microprocessor, for example.

The display portion control portion 35 receives as input the image signals output from the signal processing portion 31, image signals decoded by the codec portion 33, and image signals output from the memory portion 32, for example. The display portion control portion 35 writes the image data that are input to a VRAM (Video RAM) (not shown), for example, so that a two-dimensional image is displayed on the display portion 5 (display device such as a LCD display).

The card I/F 36 is an interface for communicating data (signals) with the memory card 6. Through the card I/F 36, image signals output from the signal processing portion 31, image signals that have been encoded by the codec portion 33, and image signals stored on the memory portion 32, for example, are output and written to the memory card 6.

The flash emission control portion 37, based on commands from the control portion 34, controls the timing of the emission of flashes by the flash emission portion 4, the length of flash emission, and the amount of flashed light.

The flash emission portion 4 irradiates flashed light onto the object to capture P1 under control by the flash emission control portion 37.

<1.2: Operation of Image Capture Device>

The operation of the image capture device 100 having the foregoing configuration is described below.

The light that is reflected by the object that is being imaged is focused onto the image capture portion (image capture element) 13 by the image capture lens 11 and obtained as an image signal (video signal) through photoelectric conversion. The amount of light that is focused on the image capture portion (image capture element) 13 is adjusted by the diaphragm 12 and a shutter, which is not shown, that are provided on the light path. Image focus (focus control) by the image capture lens 11 is achieved by moving the image capture lens 11 forward and backward (in the forward-backward direction on the light path) through an auto focus function or by a manual focus function. The diaphragm 12 is controlled by commands (control signals) from the control portion 34, and adjusts the aperture for an appropriate exposure. Here, in FIG. 1, the image capture lens 11 is made of a single lens, but in practice, a lens group of a plurality of lenses is used. There is an even greater number of lenses if it is a zoom lens.

The shutter, which has not been diagramed, may be a mechanical shutter or a so-called electric shutter that adjusts the light amount in accord with the drive timing of the image capture portion (image capture element) 13.

The image that is focused on the image capture portion 13 (here, the image capture portion 13 is described as a CCD-type image sensor with 2048×1536 pixels that has a color filter divided by R (red), G (green), and B (blue), but of course the image capture portion 13 can also be an image capture element with a different number of pixels or format (such as a CMOS-type sensor)) is converted into an analog image signal and this is output from the image capture portion 13 to the analog signal processing portion 2.

The image signals that are output from the image capture portion 13 have their sampling noise reduced by the correlated double sampling (CDS) circuit 21 of the analog signal processing portion 2, the signal level is adjusted by the analog amplifier (GCA) portion 22, and they are converted to digital image signals (image data) by the A/D converter 23. The pixel data (image data) (for example, a 12 bit digital signal having a gradation level from 0 to 4095) that have been A/D converted by the A/D converter 23 are output to the signal processing portion 31 of the digital signal processing portion 3 as digital image signals.

The image data (image signal), which are subjected to various processing by the signal processing portion 31 as described later, are written to the memory portion 32, encoded by JPEG compression or the like by the codec portion 33, header information is added by the control portion 34, and written to recording media such as the memory card 6 via the card I/F 36 as image data (image signal) in the Exif file format, for example. It should be noted that the data that are written to the memory portion 32 can also be data (image signals) encoded by the codec portion 33. There are no limitations regarding where the Exif file format image data (image signals) are recorded, and for example, it is of course possible for this to be a HDD (hard disk drive) installed within the image capture device.

The image data written to the memory card 6 are displayed on the display portion 5, such as a LCD display device, by the display portion control portion 35 under control by the control portion 34.

The image signals that are input to the signal processing portion 31 are specifically subjected to dynamic range compression, white balance correction, pixel interpolation, γ correction, color correction, noise reduction, and border enhancement, for example. It should be noted that the order in which these processes are conducted can be variously changed.

R, G, and B color filters are disposed dispersed at the pixels of the image capture portion (image capture element) 13, and the image signals obtained at the pixels do not have any R, G, or B information. Thus, through pixel interpolation, image signals having information on the two colors that were not received by the respective pixels are estimated (calculated) through interpolation from the surrounding pixels (pixel values). Thus, a R component signal, a G component signal, and a B component signal can be obtained as the image signals for each pixel of the image capture portion (image capture element) 13.

γ correction is so-called gamma correction that is performed on the image data (image signals), and normally γ correction is performed on the image signals with γ=1/2.2.

Color correction involves conversion of RGB values that are determined by the properties of the color filters of the image capture portion (image capture element) 13 into RGB values of a normalized color space (a color space defined by NTSC or sRGB, for example).

Noise reduction involves distinguishing noise from the amplitude and frequency, for example, of the image signals, and reducing the noise that has been distinguished.

Border enhancement is for producing an image with resolution by compensating for the drop in MTF (modulation transfer function) due to the effects of the aperture (lens opening) or diaphragm 12 of the image capture lens 11.

<<White Balance Adjustment Method>>

The white balance adjustment (WB adjustment) method that is executed by the WB adjustment portion 312 is described next.

First, when the user presses the release button (not diagrammed) of the image capture device 100, the image capture device 100 captures an image, without emitting a flash, under image capture conditions such as the diaphragm value and shutter speed value that have been set by an exposure determining means that is not shown. The image data a (image signal a) that are captured are stored in the memory portion 32.

Next, the image capture device 100 captures an image after emitting a flash under image capture conditions such as the diaphragm value and the shutter speed value that have been similarly set. The image data b (image signal b) that are captured are stored in a separate region of the memory portion 32.

Next, the external light WB coefficient determination portion 3123 finds the WB coefficient WBcoe1 based on the image data a that were captured without emitting a flash, and outputs this to the WB coefficient calculation portion 3125. At this time, external light is the only light on the object to be captured because a flash is not emitted, and the normal WB coefficient for when a flash is not emitted can be determined by the external light WB coefficient determination portion 3123. Thus, the external light WB coefficient WBcoe1 can also be determined without using the image data a, and instead the image capture device 100 can be provided with a color sensor for assessing the color of the external light, and then the WB coefficient WBcoe1 can be determined based on the results of that color assessment.

Next, the flashed light WB coefficient setting portion 3124 outputs the flashed light WB coefficient WBcoe2, which is set in advance based on the properties of the flashed light, to the WB coefficient calculation portion 3125.

Next, the luminance of the pixels corresponding to the image data a and the image data b stored in the memory portion 32 is output to the mixture ratio calculation portion 3121.

The mixture ratio calculation portion 3121 finds the mixture ratio W0 (=a/b) by dividing the image data a, which were captured without emitting a flash, by the image data b, which were captured with emission of a flash. For each pixel, the mixture ratio W0 that is found takes on continuous value from 0.0 to 1.0 (digital value with predetermined precision) depending on the balance (ratio) of the strength of the external light and the flashed light. At this time, the mixture ratio W0 value is 0.0 in regions where only the flashed light is reflected by the captured object, and the mixture ratio W0 value is 1.0 in regions where only the external light is reflected by the captured object.

It should be noted that the luminance of the image data a and the image data b that is input to the mixture ratio calculation portion 3121 can be a luminance value Y that is expressed by Equation 1, for example, or it is possible to use any one of the R component value, G component value, and B component value.

$$Y = 0.3 \times R + 0.6 \times G + 0.1 \times B \quad [\text{Eq. 1}]$$

The LPF portion 3122 subjects the mixture ratio W0 to a spatial low pass filtering process that is already known in the art.

Since the image captured with a flash and the image captured without a flash are captured at different times, if the captured object moves during that interval, then the mixture ratio W0 becomes a different value from the balance (ratio) of the strength of the flashed light and the external light originally hoped to be obtained. Thus, rather than using the mixture ratio W0 that has been obtained as is in order to determine the WB coefficient, the fact that the mixture ratio W0 is found each pixel in correspondence with the image that is captured is exploited, and a spatial low pass filter is applied to the mixture ratio W0. By dong this, the final WB coefficient WBcoe3 can be changed in a continuous and gentle manner. Further, having the LPF portion 3122 apply a low pass filter to the mixture ratio W0 allows adverse effects due to movement of the captured object to be reduced. In other words, it is therefore possible to curtail inaccurate WB adjustment of image regions in which the captured object has moved.

Next, the mixture ratio W that has been output from the LPF portion 3122 is output to the WB coefficient calculation portion 3125. The WB coefficient calculation portion 3125 interpolates the WB coefficient WBcoe1, which is output from the external light WB coefficient determination portion 3123 and is determined in accordance with the external light, and the WB coefficient WBcoe2, which is output from the flashed light WB coefficient setting portion 3124 and is set in accordance with the flashed light, through Equation 2 using the mixture ratio W as the interpolation ratio, calculating the final WB coefficient WBcoe3, and outputs the result.

$$Kr3 = Kr1 \times W + Kr2 \times (1-W)$$

$$Kg3 = Kg1 \times W + Kg2 \times (1-W)$$

$$Kb3 = Kb1 \times W + Kb2 \times (1-W) \quad [\text{Eq. 2}]$$

Here, Kr1 is the conversion coefficient of the WB coefficient WBcoe1 for the R signal, Kg1 is the conversion coefficient of the WB coefficient WBcoe1 for the G signal, Kb1 is the conversion coefficient of the WB coefficient WBcoe1 for the B signal, Kr2 is the conversion coefficient of the WB coefficient WBcoe2 for the R signal, Kg2 is the conversion coefficient of the WB coefficient WBcoe2 for the G signal, Kb2 is the conversion coefficient of the WB coefficient WBcoe2 for the B signal, Kr3 is the conversion coefficient of the WB coefficient WBcoe3 for the R signal, Kg3 is the conversion coefficient of the WB coefficient WBcoe3 for the G signal, and Kb3 is the conversion coefficient of the WB coefficient WBcoe3 for B signal.

Thus, the WB coefficient WBcoe2 that matches the flashed light is used for pixels illuminated by only the flashed light (including pixels where illumination by the flashed light is dominant) (mixture ratio W=0.0), and the WB coefficient WBcoe1 for the external light is used for pixels hardly reached by the flashed light and that are illuminated by only the external light (mixture ratio W=1.0). In pixels illuminated by both the external light and the flashed light, a WB coefficient WBcoe3 that is intermediate between the WB coefficient WBcoe1 and the WB coefficient WBcoe2 is used according to the amount of contribution of each of light source.

Next, the WB coefficients WBcoe3 that are found for each pixel are input to the WB correction portion 3126.

The WB correction portion 3126 performs a final WB adjustment of the image data b, which were captured with a flash, by multiplying the conversion coefficients Kr3, Kg3, and Kb3 for each of the signals of the R, G, and B components of the WB coefficient WBcoe3. Then, the image data b that have been subjected to this final WB adjustment (correction) are output from the WB correction portion 3126.

The image signal b (image data b) output from the WB correction portion 3126 is input to the second signal processing portion 313, where it is subjected to processing such as γ correction, color correction, noise reduction, and border enhancement, and the result is output to the memory portion 32.

The image signals that are output to the memory portion 32 are written to the memory portion 32, encoded by JPEG compression or the like by the codec portion 33, header information is added by the control portion 34, and they are written to recording media such as the memory card 6 via the card I/F 36 as image data (image signal) in the Exif file format, for example.

Thus, the image capture device 100 allows for appropriate white balance adjustment to be carried out easily, and with little circuitry, on images that have been captured under lighting conditions that have a mixture of external light and flashed light, and also minimizes the impact of movement by the captured object, for example, so that appropriate white balance adjustment can be carried out.

The above foregoing processing assumes that the image captured with a flash and the image captured without a flash are captured under the same exposure settings. This is because it will not be possible to directly compare the luminance of two images captured by the image capture device 100 if the exposure settings are different. Capturing images such that the exposure settings are identical may lead to image regions that image the captured object becoming completely over exposed (the tone levels of pixels in the image regions become saturated level (white level)) if, for example, the distance to the captured object is shorter in the image that is captured with the flash. Similarly, images that are captured without emitting a flash may become totally underexposed (the tone levels of pixels in some regions become black level) or the S/N ratio may drop.

Accordingly, the image captured with the flash and the image captured without the flash are captured under different exposure settings. Although in this case the captured images cannot be compared directly, it is possible to find the relationship between the light amount under the respective image capture conditions from the diaphragm value, the shutter speed, and the ISO gain value (the gain value for the ISO sensitivity (index for the film sensitivity; a numeric evaluation of the sensitivity of the film to light as set by the ISO (International Organization for Standardization)). In other words, the image data that are obtained by imaging in which a flash is emitted and the image data that are obtained by imaging in which a flash is not emitted are both corrected based on the exposure settings at the time the image was captured (corrected such that the exposure settings are cancelled out), and with the corrected image data the mixture ratio W0 is found in the same manner as discussed above. Then, using the mixture ratio W0 thus found to carry out the processing discussed above, it is possible to perform appropriate WB adjustment even in instances where images are captured under different exposure settings.

Further, the above description is of a case in which the image capture operation is explicitly performed in order to obtain the image data a, which are obtained by imaging without a flash, but the image data a, which are obtained by imaging without a flash, may only be used to compute the mixture ratio W0 in order to find the final WB coefficient WBcoe3.

For this reason, it is not necessary for the image data a to have as many pixels as the image data that are captured using a flash, and the same results as those described above can be obtained also in a case in which the image data a are kept in the memory portion 32 as reduced image data and expanded when it is necessary to calculate the mixture ratio W0, and then the same processing as described above is performed.

By doing this, the amount of memory in the memory portion 32 that is required for storing the image data a can be reduced.

Figure 3:
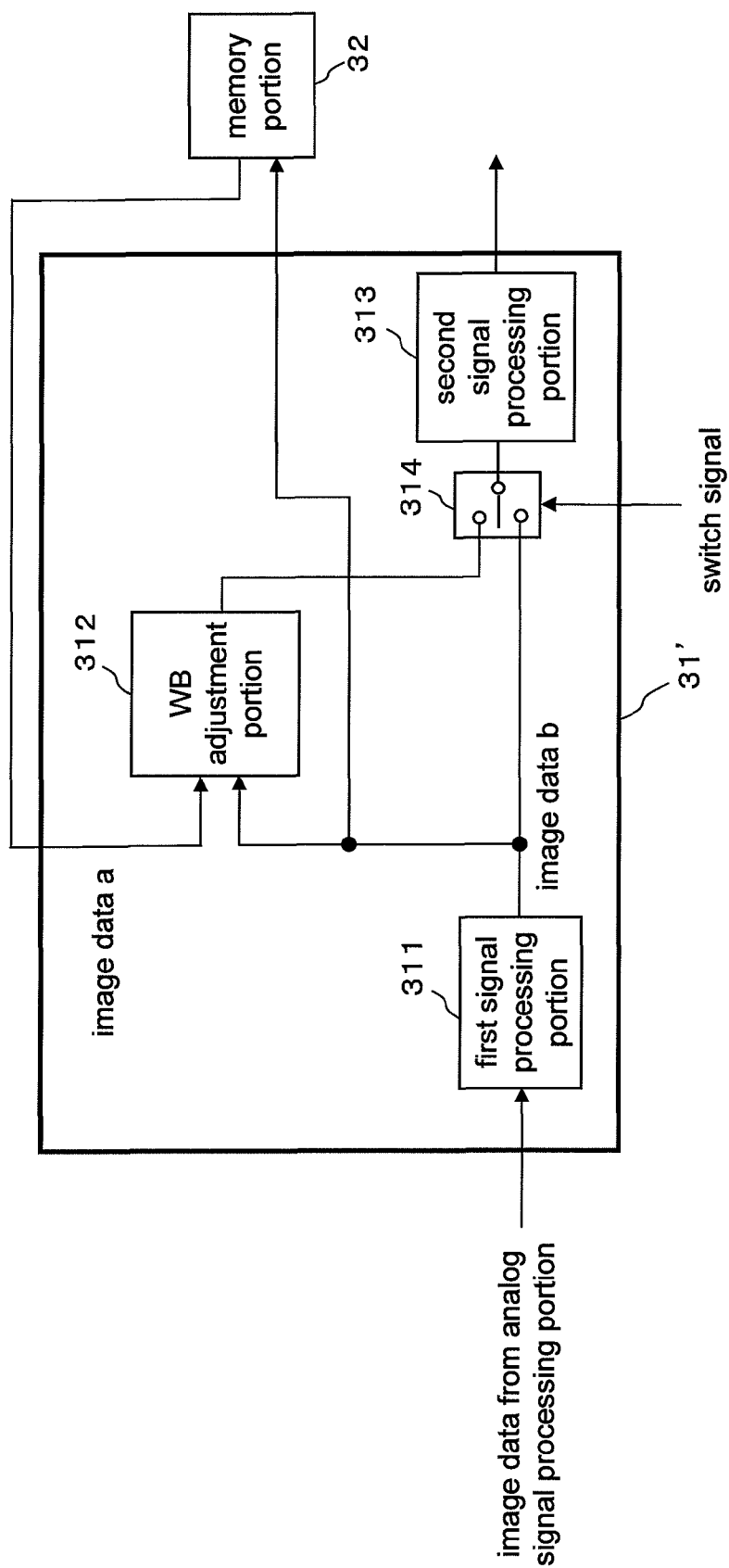
FIG. 3 is a diagram of the structure of the signal processing portion 31' and the memory portion 32 of the image capture device 100 according to the first embodiment of the invention.

The signal processing portion 31 may be replaced with the structure of a signal processing portion 31' as shown in FIG. 3. That is, the signal processing portion 31' can have a configuration in which the image signal (image data) output from the first signal processing portion 311 is input to the WB adjustment portion 312 as image data b. By adopting this configuration, it is no longer necessary to explicitly capture images without a flash, and the image data that correspond to the live preview image that is displayed on the view finder prior to pressing the shutter button are input to the WB adjustment portion 312 as image data b, and by the image capture device 100 executing the same processing as above, it is possible to appropriately perform WB adjustment of the image data b.

Thus, it is possible to reduce the difference in the time of capture between the captured image that is obtained under flash-less conditions (that is, the live view image that is displayed on the view finder prior to pressing the shutter button) and the image that is captured with emission of a flash, and thus negative impact due to movement of the object being captured can be reduced.

MODIFIED EXAMPLE

Next, an image capture device according to a modified example of the first embodiment is described.

Figure 6:
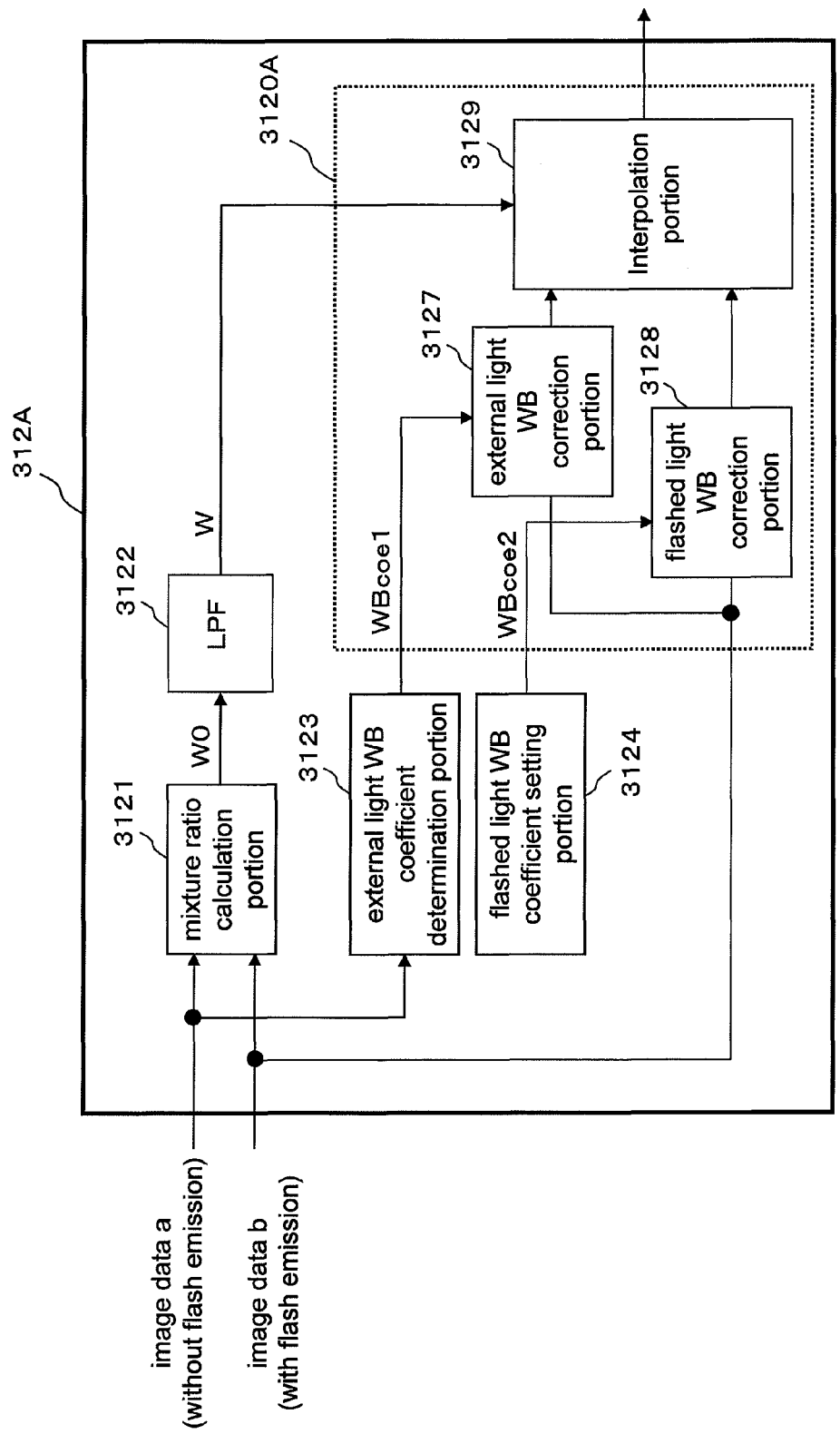
FIG. 6 is a diagram that schematically shows the structure of the WB adjustment portion 312A of the image capture device according to a modified example of the first embodiment of the invention.

FIG. 6 schematically shows the configuration of a WB adjustment portion 312A of the image capture device according to this modified example.

The image capture device of this modified example is the image capture device 100 according to the first embodiment, except that its WB processing portion 3120 has been substituted with the WB processing portion 3120A that is shown in FIG. 6. Apart from this, it is identical to the image capture device 100 according to the first embodiment, and thus will not be described in detail.

As shown in FIG. 6, the WB processing portion 3120A is provided with an external light WB correction portion 3127, a flashed light WB correction portion 3128, and an interpolation portion 3129.

The external light WB correction portion 3127 receives the image data b (the image data when there is flashed light) and the external light WB coefficient WBcoe1 that is output from the external light WB coefficient determination portion 3123. The external light WB correction portion 3127 performs white balance correction (WB correction) on the image data b using the external light WB coefficient WBcoe1. Then, the image data that have been subjected to this WB correction for the external light (the image data are referred to as "image data c1") are output to the interpolation portion 3129.

The flashed light WB correction portion 3128 receives the image data b (the image data when there is flashed light) and the flashed light WB coefficient WBcoe2 that is output from the flashed light WB coefficient setting portion 3124. The flashed light WB correction portion 3128 performs white balance correction (WB correction) on the image data b using the flashed light WB coefficient WBcoe2. Then, the image data that have been subjected to this WB correction for flashed light (the image data are referred to as "image data c2") are output to the interpolation portion 3129.

The interpolation portion 3129 receives the image data c1 that are output from the external light WB correction portion 3127, the image data c2 that are output from the flashed light WB correction portion 3128, and the mixture ratio (smoothed mixture ratio) W that is output from the LPF 3122. The interpolation portion 3129 then internally divides the image data c1 and the image data c2 with the mixture ratio (smoothed mixture ratio) W serving as the interpolation ratio. In other words, the interpolation portion 3129 obtains an image signal (image data) in which, if Sout is the output signal (output image data) from the interpolation portion 3129, then Sout as calculated by $$Sout = W \cdot c1 + (1-W) \cdot c2$$

is the signal value. The interpolation portion 3129 then outputs the image signal (image data) that is obtained to the switch 314. The subsequent processing is identical to the processing already described above, and thus id not be described here.

Thus, with the image capture device according to this modified example it is possible for appropriate white balance adjustment to be carried out easily, and with little circuitry, on images that have been captured under lighting conditions with a mixture of external light and flashed light, and also the impact of movement by the captured object, for example, is minimized so that appropriate white balance adjustment can be carried out.

Second Embodiment

Figure 7:
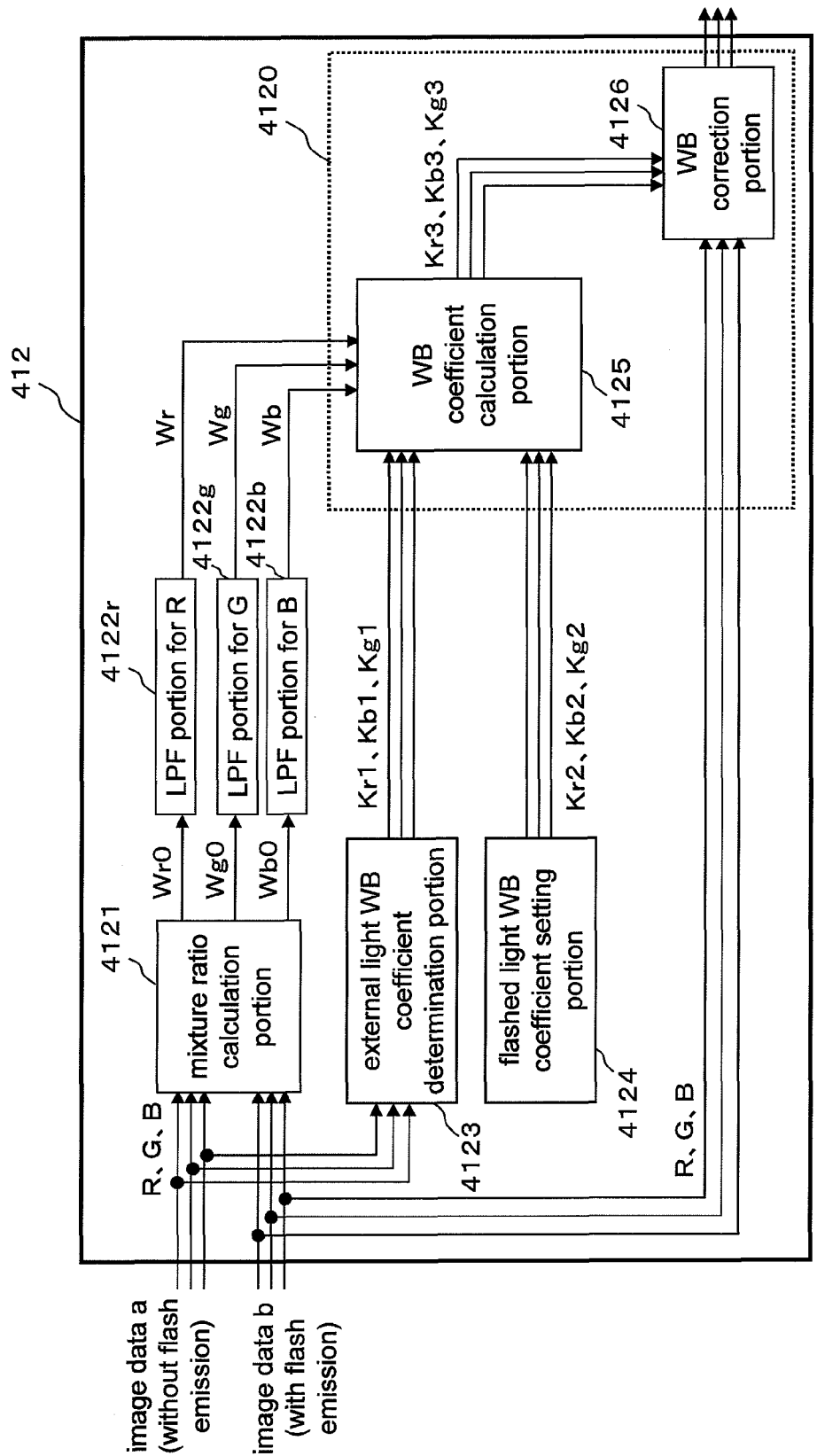
FIG. 7 is a diagram of the structure of the WB adjustment portion 412 according to the second embodiment of the invention.

In the first embodiment of the invention, the luminance value of the image data that are captured with emitting a flash and the luminance of the image data captured without emitting a flash are used to find a single mixture ratio W0 (or smoothed mixture ratio W) for each pixel. The second embodiment of the invention describes an implementation in which mixture ratios (or smoothed mixture ratios) that correspond to the R component, G component, and B component of the image data are found for each pixel, and this is described using FIGS. 1 and 7. It should be noted that the image capture device according to this embodiment differs from the image capture device 100 of the first embodiment in that the WB adjustment portion 312 is replaced with a WB adjustment portion 412. In other regards it is identical to the image capture device 100 according to the first embodiment, and thus is not described. FIG. 7 illustrates how a WB processing portion 4120 is made from a WB coefficient calculation portion 4125 and a WB correction portion 4126.

In general, WB adjustment is carried out such that if, for example, the illumination lighting color temperature is high, that is, if the B component light is stronger than the light of the other R and G components of the illumination lighting, then adjustment (WB adjustment) is performed by lowering the gain for the B component signal in order to substantially equalize the signals for the R, G and B components in the image data that are obtained when a white object is imaged.

However, although the WB coefficient is accurate when there is only flashed light or only external light, there is no guarantee when those two light sources are mixed that the WB coefficient will be a simple interpolated value of the WB coefficients for those two light sources. In practice, since the two light sources have different color temperatures, it is not possible to perform correct WB adjustment based on those two luminance values.

This problem does not occur when the two light sources share the same color temperature, and indeed, the problem that this invention strives to solve would not exist if the two shared the same color temperature in the first place. The WB coefficients for the flashed light and the external light would be identical if the two were the same color temperature, and the final WB coefficients that are obtained by interpolating with the mixture ratio would be the same. Thus it is not necessary to switch the processing based on whether or not the flashed light and the external light are different color temperatures.

FIG. 7 shows the configuration of a white balance adjustment portion (WB adjustment portion) 412 according to this embodiment.

In this embodiment, the two image data sets of image data b, which are obtained through imaging with the emission of a flash, and image data a, which are obtained through imaging without the emission of a flash, are stored in the memory portion 32, and the processing up through determination of the WB coefficient WBcoe1 in accordance with the external light is the same as in the first embodiment and thus will not be described.

The R component value, the G component value, and the B component value of the pixels corresponding image data a and the image data b stored in the memory portion 32 are each output to a mixture ratio calculation portion 4121. The mixture ratio calculation portion 4121 divides the signals (signal values) for the R component, G component, and B component of the image data a, which are obtained through imaging without the emission of a flash, by the signals (signal values) for the R component, G component, and B component of the image data b, which are obtained through imaging with the emission of a flash, to obtain mixture ratios Wr0, Wg0, and Wb0 for the R component, G component, and B component signals, respectively.

Next, the mixture ratio calculation portion 4121 outputs the mixture ratios Wr0, Wg0, and Wb0 to a LPF portion for R 4122r, a LPF portion for G 4122g, and a LPF portion for B 4122b, respectively. The LPF portion for R 4122r, the LPF portion for G 4122g, and the LPF portion for B 4122b execute a well-known spatial low pass filter processing on the mixture ratios Wr0, Wg0, and Wb0.

Next, the LPF portion for R 4122*r*, the LPF portion for G 4122*g*, and the LPF portion for B 4122*b* output mixture ratios (smoothed mixture ratios) Wr, Wg, and Wb to the WB coefficient calculation portion 4125. The WB coefficient calculation portion 4125 interpolates, according to Equation 3, the external light WB coefficients WBcoe1 (Kr1, Kb1, and Kg1), which are determined according to the external light, and the flashed light WB coefficients WBcoe2 (Kr2, Kb2, and Kg2), which are set in advance based on the properties of the flashed light, using the mixture ratios Wr, Wg, and Wb as interpolation ratios in order to determine final WB coefficients WBcoe3 (Kr3, Kb3, and Kg3), and outputs these to the WB correction portion 4126.

$$Kr3 = Kr1 \times Wr + Kr2 \times (1-Wr)$$

$$Kg3 = Kg1 \times Wg + Kg2 \times (1-Wg)$$

$$Kb3 = Kb1 \times Wb + Kb2 \times (1-Wb) \quad \text{[Eq. 3]}$$

Here, Kr1 is the conversion coefficient of the WB coefficient WBcoe1 for the R component signal, Kg1 is the conversion coefficient of the WB coefficient WBcoe1 for the G component signal, Kb1 is the conversion coefficient of the WB coefficient WBcoe1 for the B component signal, Kr2 is the conversion coefficient of the WB coefficient WBcoe2 for the R component signal, Kg2 is the conversion coefficient of the WB coefficient WBcoe2 for the G component signal, Kb2 is the conversion coefficient of the WB coefficient WBcoe2 for the B component signal, Kr3 is the conversion coefficient of the WB coefficient WBcoe3 for the R component signal, Kg3 is the conversion coefficient of the WB coefficient WBcoe3 for the G component signal, and Kb3 is the conversion coefficient of the WB coefficient WBcoe3 for B component signal.

It should be noted that a specific example of the configuration of the WB coefficient calculation portion 4125 can be achieved by providing the same configuration as that shown in FIG. 5 for each of R, G, and B.

Next, the WB coefficients WBcoe3 that are found for each pixel are input to the WB correction portion 4126. The WB correction portion 4126 multiplies the image data b, which is obtained through imaging taken with a flash, by the conversion coefficients Kr3, Kg3, and Kb3 respectively corresponding to the signals for the R component, G component, and B component of the WB coefficient WBcoe3, and by doing so performs the final WB adjustment on the image data b. The image data b that have been subjected to this final WB adjustment (correction) are output from the WB correction portion 4126.

The image signal b (image data b) is output from the WB correction portion 4126 to the second signal processing portion 313, which executes processing such as γ correction, color correction, noise reduction, and border enhancement, and outputs the result to the memory portion 32.

The image signals that are output to the memory portion 32 are written to the memory portion 32, encoded by JPEG compression or the like by the codec portion 33, the control portion 34 adds header information, and they written to recording media such as the memory card 6 via the card I/F 36 as image data (image signal) in the Exif file format, for example.

FIG. 9 is a chart that compares the result of WB adjustment in the first embodiment of the invention, and the result of WB adjustment in the second embodiment of the invention, with actual numbers. FIG. 9A shows the result of WB adjustment according to the first embodiment, and FIG. 9B shows the result of WB adjustment according to the second embodiment, when image data are obtained for the same position through imaging with the emission of a flash and imaging without the emission of a flash, and FIG. 9C shows the flashed light WB coefficient and the external light WB coefficient in this calculated example.

First, the calculations (processing results) made according to the first embodiment of the invention are described using FIG. 9A.

The chart shown in FIG. 9A from left to right describes each stage, from the two input images to the final WB-adjusted output image, in that order. Here, the data values in the column labeled Flash OFF Image are the R component value (value in Ra column), the G component value (value in Ga column), and the B component value (value in Ba column) of a given pixel in the image that has been captured without emitting the flash. Similarly, the data values in the column labeled Flash ON Image are the R component value (value in Rb column), the G component value (value in Gb column), and the B component value (value in Bb column) of a given pixel in the image that has been captured with the flash.

The Ya column lists luminance values Ya for the Ra value, Ga value, and Ba value that are listed in the same row, and the Yb column lists luminance values Yb for the Rb value, Gb value, and Bb value that are listed in the same row.

The Mixture Ratio column lists the W value of the balance (ratio) W between the flashed light and the external light, and as can be understood from the data of this column, the first row is for a case in which there is no outside light and only flashed light, and progressing downward the rows show an altered balance (ratio), such that the final row lists data values for a case in which there is no flashed light and only outside light.

Both images (the flash off image and the flash on image) are pixel values assuming that a white object is being imaged. Thus, in the flash on image the WB coefficients WBcoe1 (Kr1, Kg1, and Kb1) for external light and the pixel values (Ra, Ga, and Ba) have the following relationship.

$$Kr1 \times Ra = Kg1 \times Ga = Kb1 \times Ba \quad \text{[Eq. 4]}$$

The first row of data in the area of FIG. 9A where data are listed in the table are data values that have been captured under the condition of no external light and flashed light only. Thus, in the flash on image the WB coefficients WBcoe2 (Kr2, Kg2, and Kb2) of the flashed light and the pixel values (Rb, Gb, and Bb) have the following relationship.

$$Kr2 \times Rb = Kg2 \times Gb = Kb2 \times Bb \quad \text{[Eq. 5]}$$

Next, the luminance values Ya are found with Eq. 1 from the R component value, the G component value, and the B component value of the flash off image. The luminance values Yb are similarly found for the flash on image.

Next, the luminance values Ya of the flash off image are divided by the luminance values Yb of the flash on image in order to obtain mixture ratios W. The data values in the mixture ratio W column of FIG. 9A show that the mixture ratio W of the first row, in which there was no external light and only flashed light, is 0.0, whereas the mixture ratio W of the last row, in which there was no flashed light and only external light, is 1.0.

Next, the final WB coefficients WBcoe3 (listed as WB coefficient 3 in the table of FIG. 9A) can be found with Eq. 2 using the mixture ratios W. Then, with the below formula, the outcome of performing WB adjustment using the WB coefficients WBcoe3 are the R component value, the G component value, and the B component value of the output image.

$$R = Kr3 \times Rb$$

$$G = Kg3 \times Gb$$

$$B = Kb3 \times Bb \quad \text{[Eq. 6]}$$

The calculated results of the table of FIG. 9A make it clear that with the first embodiment of the invention, the output image signal (output image data) is completely white (R=0.50, G=0.50, B=0.50) in the first row where there is only flashed light and no external light and in the last row where there is only external light and no flashed light, and is substantially corrected to white even when there is a mixture of external light and flashed light (corresponds to the data of the second through the tenth rows of data listed in the table of FIG. 9A).

Next, the calculations (processing results) according to the second embodiment of the invention are described using FIG. 9B.

The inputs, that is, the image data captured without emitting a flash (flash off image) and the image data that are captured with the use of a flash (flash on image), are the same as in the table of FIG. 9A.

In the second embodiment of the invention, the mixture ratio is found for each of the R component, the G component, and the B component, and thus, for example, by dividing Ra, which is the R value of the flash off image, by Rb, which is the R value of the flash on image, the mixture ratio Wr for the R component is found. Wb and Wg can be found in a similar manner.

Next, the final WB coefficients 3 (WB coefficients WBcoe3) can be found according to Eq. 3 using the mixture ratios Wr, Wg, and Wb. Then, the result of executing WB adjustment according to Eq. 6 using the WB coefficients 3 (WB coefficients coe3) is the R component value, the G component value, and the B component value that are listed in the output image column in the table of FIG. 9B.

The calculation results in the table of FIG. 9B clearly show that with the second embodiment of the invention, the output image signal is completely white in not only the first row, where there is only flashed light and no external light, and in the last row where there is only external light and no flashed light, but also when there is a mixture of external light and flashed light (corresponds to the data of the second through the tenth rows of data listed in the table of FIG. 9B).

It should be noted that processing by the LPF portion 3122, the LPF portion for R 4122*r*, the LPF portion for G 4122*g*, and the LPF portion for B 4122*b* has been omitted in the calculations of FIG. 9A and FIG. 9B.

Thus, with the invention, it is possible to perform appropriate white balance adjustment easily, and with little circuitry, on images that have been captured under lighting conditions with a mixture of external light and flashed light, and also the impact of movement by the captured object, for example, is minimized so that appropriate white balance adjustment can be carried out

MODIFIED EXAMPLE

Next, an image capture device according to a modified example of the second embodiment is described.

Figure 8:
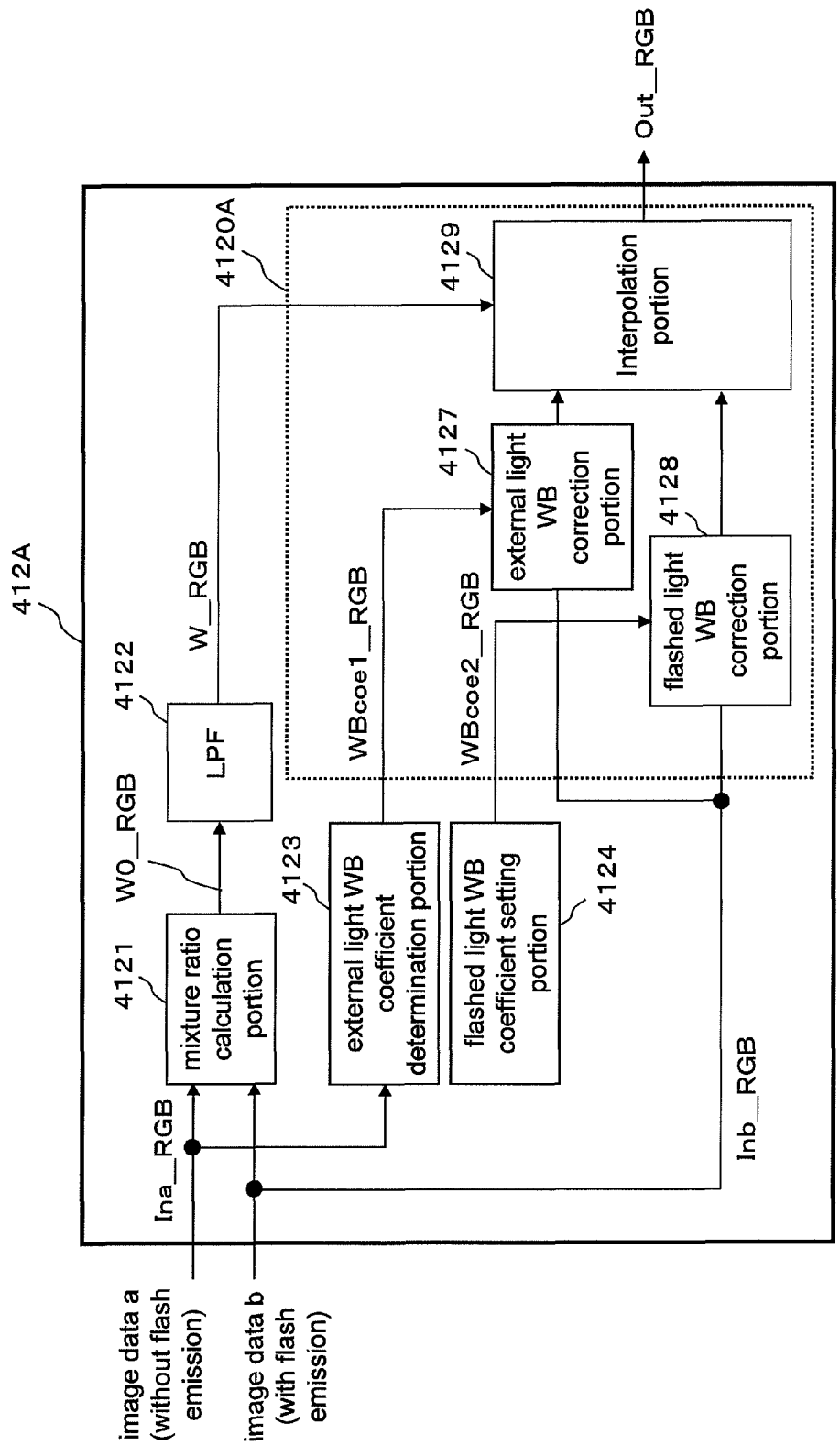
FIG. 8 is a diagram of the structure of the WB adjustment portion 412A according to the modified example of the second embodiment of the invention.

FIG. 8 schematically shows the configuration of a WB adjustment portion 412A of the image capture device according to this modified example.

The image capture device of this modified example is the image capture device according to the second embodiment, except that its WB processing portion 4120 has been substituted with the WB processing portion 4120A that is shown in FIG. 8. Apart from this, it is identical to the image capture device according to the second embodiment, and thus will not be described in detail.

It should be noted that FIG. 7 shows the three data input/output lines (connection lines) for R, G, and B, but in FIG. 8 the three R, G, and B data sets are treated as a single vector data set, and the three RGB input/output lines (connection lines) are shown as a single input/output line (connection line). Further, the LPF for R 4122*r*, the LPF for G 4122*g*, and the LPF for B 4122*b* are treated as a LPF 4122.

Ina_RGB is the vector data for the image data a, Inb_RGB is the vector data for the image data b, and W0_RGB is the vector data output from the mixture ratio calculation portion 4121. W_RGB is the vector data output from the LPF 4122, WBcoe1_RGB is the vector data output from an external light WB coefficient determination portion 4123, WBcoe2_RGB is the vector data output from a flashed light WB coefficient setting portion 4124, and Out_RGB is the vector data output from an interpolation portion 4129.

As shown in FIG. 8, the WB processing portion 4120A is provided with an external light WB correction portion 4127, a flashed light WB correction portion 4128, and an interpolation portion 4129.

The external light WB correction portion 4127 receives the RGB vector data Inb_RGB of the image data b (image data when there is flashed light) and the external light WB coefficient WBcoe1_RGB that is output from the external light WB coefficient determination portion 4123. The external light WB correction portion 4127 performs white balance correction (WB correction) on the RGB vector data Inb_RGB of the image data b using the external light WB coefficient WBcoe1_RGB. Then, the image data that have been subjected to this external light WB correction processing (the image data (RGB vector data) are referred to as image data c1_RGB) are output to the interpolation portion 4129.

The flashed light WB correction portion 4128 receives the RGB vector data Inb_RGB of the image data b (image data when there is flashed light) and the flashed light WB coefficient WBcoe2_RGB that is output from the flashed light WB coefficient setting portion 3124. The flashed light WB correction portion 4128 performs white balance correction (WB correction) on the RGB vector data Inb_RGB of the image data b using the flashed light WB coefficient WBcoe2_RGB. Then, the image data that have been subjected to this flashed light WB correction processing (the image data (RGB vector data) are referred to as image data c2_RGB) are output to the interpolation portion 4129.

The interpolation portion 4129 receives the image data c1_RGB that are output from the external light WB correction portion 4127, the image data c2_RGB that are output from the flashed light WB correction portion 4128, and the mixture ratio (smoothed mixture ratio) W_RGB that is output from the LPF 4122. The interpolation portion 4129 uses the mixture ratio (smoothed mixture ratio) W_RGB as the interpolation ratio to interpolate the image data c1_RGB and the image data c2_RGB. That is, the interpolation portion 4129 obtains an image signal (image data (RGB vector data)) whose signal value is Sout_RGB, which serves as the output signal (output image data (RGB vector data)) from the interpolation portion 4129 and is calculated by $$\text{Sout\_RGB} = W\_RGB \cdot c1\_RGB + (1 - W\_RGB) \cdot c2\_RGB).$$

In other words, the same interpolation processing as described in the modified example of the first embodiment is performed for each of the R component, the G component, and the B component. The interpolation portion 4129 then outputs the image signal that is obtained (image data (RGB vector data)) to the switch 314. The subsequent processing is the same as the processing that has already been described, and thus is not described.

Thus, with the image capture device according to this modified example it is possible for appropriate white balance adjustment to be carried out easily, and with little circuitry, on images that have been captured under lighting conditions with a mixture of external light and flashed light, and also the impact of movement by the captured object, for example, is minimized so that appropriate white balance adjustment can be carried out.

Other Embodiments

It should be noted that in the image capture devices that are described in the above embodiments, the various blocks can be provided as individually as single chips, or some or all of the blocks may be incorporated into a single chip, by a semiconductor device such as an LSI.

It should be noted that here an LSI is adopted, but depending on differences in the degree of integration, it may be referred to as an IC, system LSI, super LSI, or an ultra LSI.

The method of circuit integration is not limited to an LSI, and it is also possible to adopt a dedicated circuit or a generalized processor. After LSI fabrication, it is possible to employ a programmable FPGA (Field Programmable Gate Array) or a reconfigurable processor in which the connections and settings of the cells within the integrated circuit can be reconfigured.

Further, if other technologies that improve upon or are derived from semiconductor technologies introduce integration technology that supplants LSI, then naturally it is also possible to integrate the functional blocks using that technology. Biotechnology applications are one conceivable possibility.

The processing of the embodiments can be achieved by hardware as well as achieved by software. The processing can also be achieved by a combination of both hardware and software. It should be noted that if the image capture device according to the embodiments is achieved by hardware, then of course it is necessary to adjust the timing at which the various processes are performed. For the sake of simplifying the description, the embodiments did not include a detailed discussion of adjusting the timing of the various signals that occurs in an actual hardware model.

It should be noted that the specific configuration of the invention is not limited to the embodiments discussed above, and various modifications and alterations are possible within a scope that does not deviate from the gist of the invention.

With the white balance adjustment device, image capture device, white balance adjustment method, storage medium, and integrated circuit according to the invention, it is possible to perform appropriate white balance adjustment and obtain natural image data even when an image is captured under conditions with a mixture of different lighting, such as external light and flashed light, and thus these have utility in fields related to video and image processing devices, and the white balance adjustment device, image capture device, white balance adjustment method, storage medium, and integrated circuit of the invention can be implemented in such fields.

What is claimed is:

1. A white balance adjustment device, comprising:
a mixture ratio calculation portion operable to calculate a mixture ratio of an external light component and a flashed light component that are present in a second image signal, the mixture ratio being calculated based on a first image signal that is obtained without irradiating a flashed light on an object to be captured, and the second image signal that is obtained by illuminating the flashed light on the object to be captured;
an external light WB coefficient determination portion operable to determine an external light WB coefficient, which is a white balance coefficient for the external light, the external light WB coefficient being determined from the first image signal;
a flashed light WB coefficient setting portion operable to set a flashed light WB coefficient, which is a white balance coefficient of the flashed light; and
a WB processing portion operable to continuously perform white balance adjustment of the second image signal between the external light WB coefficient and the flashed light WB coefficient by using the calculated mixture ratio as an interpolation ratio,
wherein the WB processing portion obtains a third image signal by performing white balance correction on the second image signal based on the external light WB coefficient,
wherein the WB processing portion obtains a fourth image signal by performing white balance correction on the second image signal based on the flashed light WB coefficient, and
wherein the WB processing portion obtains a final image signal, which takes on a continuous value, by interpolating a signal value of the third image signal and a signal value of the fourth image signal based on the calculated mixture ratio.

2. The white balance adjustment device according to claim 1,
wherein the mixture ratio calculation portion calculates an external light ratio, as the mixture ratio, according to the following formula:

(the external light ratio)=(a signal value of the first image signal)/(a signal value of the second image signal).

3. The white balance adjustment device according to claim 1,
wherein the mixture ratio calculation portion calculates a flashed light ratio, as the mixture ratio, according to one of the following formulas:

(the flashed light ratio)=1−(a signal value of the first image signal)/(a signal value of the second image signal); and (the flashed light ratio)=(the signal value of the second image signal−the signal value of the first image signal)/(the signal value of the second image signal).

4. The white balance adjustment device according to claim 1,
wherein the WB processing portion obtains, as the final image signal, an image signal having a signal value of Sout, which is continuously calculated by any one of:

$$Sout = S2 + w1 \cdot (S1 - S2);$$

$$Sout = w1 \cdot S1 + (1 - w1) \cdot S2;$$

-continued $$Sout = S1 + w2 \cdot (S2 - S1);$$

$$Sout = (1 - w2) \cdot S1 + w2 \cdot S2; \text{ and}$$

$$Sout = w1 \cdot S1 + w2 \cdot S2,$$

wherein w1 (0<w1<1) is an external light ratio, w2 (0<w2<1) is a flashed light ratio, S1 is the signal value of the third image signal, S2 is the signal value of the fourth image signal, and Sout is the signal value of the final image signal.

5. The white balance adjustment device according to claim 1, further comprising:
an LPF portion operable to perform low pass filter processing on the calculated mixture ratio to calculate a smoothed mixture ratio,
wherein the WB processing portion uses the smoothed mixture ratio as the mixture ratio.

6. A white balance adjustment device comprising:
a mixture ratio calculation portion operable to calculate a mixture ratio of an external light component and a flashed light component that are present in a second image signal, the mixture ratio being calculated based on a first image signal that is obtained without irradiating a flashed light on an object to be captured, and the second image signal that is obtained by illuminating the flashed light on the object to be captured;
an external light WB coefficient determination portion operable to determine an external light WB coefficient, which is a white balance coefficient for the external light, the external light WB coefficient being determined from the first image signal;
a flashed light WB coefficient setting portion operable to set a flashed light WB coefficient, which is a white balance coefficient of the flashed light; and
a WB processing portion operable to continuously perform white balance adjustment of the second image signal between the external light WB coefficient and the flashed light WB coefficient by using the calculated mixture ratio as an interpolation ratio,
wherein the mixture ratio calculation portion estimates an R component mixture ratio based on a first R image signal, which is an R component signal of the first image signal, and a second R image signal, which is an R component signal of the second image signal, estimates a G component mixture ratio based on a first G image signal, which is a G component signal of the first image signal, and a second G image signal, which is a G component signal of the second image signal, and estimates a B component mixture ratio based on a first B image signal, which is a B component signal of the first image signal, and a second B image signal, which is a B component signal of the second image signal,
wherein the external light WB coefficient determination portion determines an external light R component WB coefficient, an external light G component WB coefficient, and an external light B component WB coefficient from the first R image signal, the first G image signal, and the first B image signal, respectively,
wherein the flashed light WB coefficient setting portion sets a flashed light R component WB coefficient, a flashed light G component WB coefficient, and a flashed light B component WB coefficient, and
wherein the WB processing portion includes:
an external light WB correction portion operable to obtain a third R image signal, which is an R component signal of a third image signal, a third G image signal, which is a G component signal of the third image signal, and a third B image signal, which is a B component signal of the third image signal, by performing white balance correction on the second R image signal, the second G image signal, and the second B image signal based on the external light R component WB coefficient, the external light G component WB coefficient, and the external light B component WB coefficient, respectively;
a flashed light WB correction portion operable to obtain a fourth R image signal, which is an R component signal of a fourth image signal, a fourth G image signal, which is a G component signal of the fourth image signal, and a fourth B image signal, which is a B component signal of the fourth image signal, by performing white balance correction on the second R image signal, the second G image signal, and the second B image signal based on the flashed light R component WB coefficient, the flashed light G component WB coefficient, and the flashed light B component WB coefficient, respectively; and
an interpolation portion operable to obtain a final R image signal, which takes on a continuous value, by interpolating a signal value of the third R image signal and a signal value of the fourth R image signal, based on the R component mixture ratio, obtain a final G image signal, which takes on a continuous value, by interpolating a signal value of the third G image signal and a signal value of the fourth G image signal, based on the G component mixture ratio, and obtain a final B image signal, which takes on a continuous value, by interpolating a signal value of the third B image signal and a signal value of the fourth B image signal, based on the B component mixture ratio.

7. An image capture device comprising the white balance adjustment device according to claim 1.

8. The image capture device according to claim 7, further comprising a flash emission portion operable to irradiate the flashed light onto the object to be captured.

9. A white balance adjustment method, comprising:
calculating a mixture ratio of an external light component and a flashed light component that are present in a second image signal, the mixture ratio being calculated based on a first image signal that is obtained without irradiating a flashed light on an object to be captured, and the second image signal that is obtained by illuminating the flashed light on the object to be captured;
determining an external light WB coefficient, which is a white balance coefficient for the external light, the external light WB coefficient being determined from the first image signal;
setting a flashed light WB coefficient, which is a white balance coefficient of the flashed light; and
using the calculated mixture ratio as an interpolation ratio to continuously perform white balance adjustment of the second image signal between the external light WB coefficient and the flashed light WB coefficient,
wherein the using of the calculated mixture ratio to continuously perform the white balance adjustment includes:
obtaining a third image signal by performing white balance correction on the second image signal based on the external light WB coefficient;
obtaining a fourth image signal by performing white balance correction on the second image signal based on the flashed light WB coefficient; and obtaining a final image signal, which takes on a continuous value, by interpolating a signal value of the third image signal and a signal value of the fourth image signal, based on the calculated mixture ratio.

10. A non-transitory computer-readable storage medium that stores a program for causing a computer to function as:
a mixture ratio calculation portion operable to calculate a mixture ratio of an external light component and a flashed light component that are present in a second image signal, the mixture ratio being calculated based on a first image signal that is obtained without irradiating a flashed light on an object to be captured, and the second image signal that is obtained by illuminating the flashed light on the object to be captured;
an external light WB coefficient determination portion operable to determine an external light WB coefficient, which is a white balance coefficient for the external light, the external light WB coefficient being determined from the first image signal;
a flashed light WB coefficient setting portion operable to set a flashed light WB coefficient, which is a white balance coefficient of the flashed light; and
a WB processing portion operable to continuously perform white balance adjustment of the second image signal between the external light WB coefficient and the flashed light WB coefficient by using the calculated mixture ratio as an interpolation ratio,
wherein the WB processing portion obtains a third image signal by performing white balance correction on the second image signal based on the external light WB coefficient,
wherein the WB processing portion obtains a fourth image signal by performing white balance correction on the second image signal based on the flashed light WB coefficient, and
wherein the WB processing portion obtains a final image signal, which takes on a continuous value, by interpolating a signal value of the third image signal and a signal value of the fourth image signal based on the calculated mixture ratio.

11. An integrated circuit, comprising:
a mixture ratio calculation portion operable to calculate a mixture ratio of an external light component and a flashed light component that are present in a second image signal, the mixture ratio being calculated based on a first image signal that is obtained without irradiating a flashed light on an object to be captured, and the second image signal that is obtained by illuminating the flashed light on the object to be captured;
an external light WB coefficient determination portion operable to determine an external light WB coefficient, which is a white balance coefficient for the external light, the external light WB coefficient being determined from the first image signal;
a flashed light WB coefficient setting portion operable to set a flashed light WB coefficient, which is a white balance coefficient of the flashed light; and
a WB processing portion operable to continuously perform white balance adjustment of the second image signal between the external light WB coefficient and the flashed light WB coefficient by using the calculated mixture ratio as an interpolation ratio,
wherein the WB processing portion obtains a third image signal by performing white balance correction on the second image signal based on the external light WB coefficient,
wherein the WB processing portion obtains a fourth image signal by performing white balance correction on the second image signal based on the flashed light WB coefficient, and
wherein the WB processing portion obtains a final image signal, which takes on a continuous value, by interpolating a signal value of the third image signal and a signal value of the fourth image signal based on the calculated mixture ratio.

* * * * *